(12) United States Patent
Wang et al.

(10) Patent No.: US 12,375,693 B2
(45) Date of Patent: Jul. 29, 2025

(54) VIDEO DECODER INITIALIZATION INFORMATION CONSTRAINTS

(71) Applicants: Beijing Bytedance Network Technology Co., Ltd., Beijing (CN); Bytedance Inc., Los Angeles, CA (US)

(72) Inventors: Ye-Kui Wang, San Diego, CA (US); Kai Zhang, San Diego, CA (US); Li Zhang, San Diego, CA (US); Yang Wang, Beijing (CN); Jizheng Xu, San Diego, CA (US); Zhipin Deng, Beijing (CN)

(73) Assignees: BEIJING BYTEDANCE NETWORK TECHNOLOGY CO., LTD., Beijing (CN); BYTEDANCE INC., Los Angeles, CA (US)

( * ) Notice: Subject to any disclaimer, the term of this patent is extended or adjusted under 35 U.S.C. 154(b) by 100 days.

(21) Appl. No.: 18/339,012

(22) Filed: Jun. 21, 2023

(65) Prior Publication Data
US 2023/0345025 A1    Oct. 26, 2023

Related U.S. Application Data

(63) Continuation of application No. PCT/CN2021/140742, filed on Dec. 23, 2021.

(30) Foreign Application Priority Data

Dec. 23, 2020  (WO) ................ PCT/CN2020/138662
Jan. 6, 2021   (WO) ................ PCT/CN2021/070411

(51) Int. Cl.
*H04N 19/00*   (2014.01)
*H04N 7/01*    (2006.01)
(Continued)

(52) U.S. Cl.
CPC .......... *H04N 19/197* (2014.11); *H04N 7/014* (2013.01); *H04N 19/184* (2014.11); *H04N 19/44* (2014.11); *H04N 19/70* (2014.11)

(58) Field of Classification Search
CPC .... H04N 19/197; H04N 7/014; H04N 19/184; H04N 19/44; H04N 19/70; H04N 21/26258; H04N 21/85406; H04N 21/6547
See application file for complete search history.

(56) References Cited

U.S. PATENT DOCUMENTS 7,773,121 B1 *  8/2010  Huntsberger .......... H04N 23/51
                                                    348/374
9,786,077 B2 * 10/2017  Adsumilli ................ G06T 7/50
(Continued)

FOREIGN PATENT DOCUMENTS

CN    106464891 A    2/2017
CN    107750462 A    3/2018
(Continued)

OTHER PUBLICATIONS

"Information technology—High efficiency video coding and media delivery in heterogeneous environments—Part 2: High Efficiency Video Coding," ISO/IEC JTC 1/SC 29?WG 11 N17661, Rec. ITU-T H.265 | ISO/IEC 23008-2 (in force edition), Apr. 20, 2018, 8 pages.
(Continued)

*Primary Examiner* — Frank F Huang
(74) *Attorney, Agent, or Firm* — Conley Rose, P.C.

(57) ABSTRACT

A mechanism for processing video data is disclosed. Video decoder initialization information is signaled between an encoder to a decoder. The video decoder initialization information contains a range of initialization parameters for a plurality of video units when the plurality of video units are coded according to a same video codec and a same profile. A conversion is performed between a visual media data and
(Continued)

a visual media data file based on the range of initialization parameters.

20 Claims, 8 Drawing Sheets

(51) Int. Cl.
   *H04N 19/184* (2014.01)
   *H04N 19/196* (2014.01)
   *H04N 19/44* (2014.01)
   *H04N 19/70* (2014.01)

(56) References Cited

U.S. PATENT DOCUMENTS

| | | | | |
|---|---|---|---|---|
| 10,063,792 | B1* | 8/2018 | Brailovskiy | H04N 23/698 |
| 10,282,814 | B2* | 5/2019 | Lin | H04N 19/179 |
| 10,368,067 | B2* | 7/2019 | Lin | H04N 19/172 |
| 10,375,371 | B2* | 8/2019 | Xu | H04N 19/86 |
| 10,432,856 | B2* | 10/2019 | Chang | H04N 19/597 |
| 10,484,621 | B2* | 11/2019 | Adsumilli | H04N 19/85 |
| 10,547,879 | B2* | 1/2020 | Lai | H04N 21/23439 |
| 11,032,568 | B2* | 6/2021 | Liu | H04N 19/593 |
| 11,818,189 | B2* | 11/2023 | Sodagar | H04N 21/8456 |
| 2006/0055710 | A1* | 3/2006 | Lo | G09G 5/14 |
| | | | | 345/629 |
| 2007/0014347 | A1* | 1/2007 | Prechtl | G03B 35/08 |
| | | | | 348/E13.071 |
| 2008/0008458 | A1* | 1/2008 | Gudipaty | H04N 7/147 |
| | | | | 348/E7.083 |
| 2009/0003714 | A1* | 1/2009 | Subramaniam | H04N 19/184 |
| | | | | 375/E7.184 |
| 2009/0092191 | A1 | 4/2009 | Otsuka | |
| 2010/0001997 | A1* | 1/2010 | Kajikawa | G06T 17/20 |
| | | | | 345/419 |
| 2013/0071012 | A1* | 3/2013 | Leichsenring | G06T 19/00 |
| | | | | 382/154 |
| 2013/0106855 | A1* | 5/2013 | Urbach | G06T 15/08 |
| | | | | 345/424 |
| 2014/0086333 | A1 | 3/2014 | Wang | |
| 2014/0104376 | A1* | 4/2014 | Chen | G08B 13/19689 |
| | | | | 348/36 |
| 2014/0300693 | A1* | 10/2014 | Hirata | G03B 37/02 |
| | | | | 348/39 |
| 2014/0348227 | A1 | 11/2014 | Lee | |
| 2015/0341552 | A1* | 11/2015 | Chen | G06T 11/60 |
| | | | | 348/38 |
| 2016/0234536 | A1 | 8/2016 | Stockhammer | |
| 2016/0314610 | A1* | 10/2016 | Lee | G06T 15/06 |
| 2016/0337706 | A1* | 11/2016 | Hwang | H04N 21/23614 |
| 2017/0195615 | A1* | 7/2017 | Han | G09G 5/14 |
| 2017/0295356 | A1* | 10/2017 | Abbas | H04N 13/243 |
| 2017/0347084 | A1* | 11/2017 | Boyce | H04N 19/33 |
| 2018/0075635 | A1* | 3/2018 | Choi | H04N 13/156 |
| 2018/0077451 | A1* | 3/2018 | Yip | H04N 13/194 |
| 2018/0103199 | A1* | 4/2018 | Hendry | H04N 21/440227 |
| 2018/0213202 | A1* | 7/2018 | Kopeinigg | H04N 19/167 |
| 2018/0278964 | A1 | 9/2018 | Wang | |
| 2018/0376125 | A1* | 12/2018 | Wang | H04N 19/00 |
| 2019/0045222 | A1* | 2/2019 | Yip | H04N 19/31 |
| 2019/0104326 | A1 | 4/2019 | Stockhammer | |
| 2019/0238888 | A1* | 8/2019 | Kim | H04N 13/139 |
| 2019/0260930 | A1* | 8/2019 | Van Hoff | H04N 13/194 |
| 2019/0297132 | A1* | 9/2019 | Wang | H04L 65/752 |
| 2020/0053392 | A1 | 2/2020 | Hannuksela | |
| 2020/0112761 | A1* | 4/2020 | Stockhammer | H04N 21/2387 |
| 2020/0221159 | A1 | 7/2020 | Stockhammer | |
| 2021/0037237 | A1* | 2/2021 | Hsiang | H04N 19/70 |

FOREIGN PATENT DOCUMENTS

| | | |
|---|---|---|
| CN | 108370450 A | 8/2018 |
| CN | 109803141 A | 5/2019 |
| CN | 111194551 A | 5/2020 |
| WO | 2022136313 A2 | 6/2022 |

OTHER PUBLICATIONS

Document: JVET-G1001-v1, Chen, J., et al., "Algorithm description of Joint Exploration Test Model 7 (JEM7)," Joint Video Exploration Team (JVET) of ITU-T SG 16 WP 3 and ISO/IEC JTC 1/SC 29/WG 11 7th Meeting: Torino, IT, Jul. 13-21, 2017, 50 pages.

Rec. ITU-T H.266 | ISO/IEC 23090-3, "Series H: Audiovisual and Multimedia Systems Infrastructure of audiovisual services—Coding of moving video Versatile Video Coding," Recommendation ITU-T H.266, Aug. 2020, 516 pages.

Document: JVET-S2001-vH, Bross, B., et al., "Versatile Video Coding (Draft 10)," Joint Video Experts Team (JVET) of ITU-T SG 16 WP 3 and ISO/IEC JTC 1/SC 29/WG 11 19th Meeting: by teleconference, Jun. 22-Jul. 1, 2020, 548 pages.

Series H: Audiovisual and Multimedia Systems Infrastructure of audiovisual services—Coding of moving video Versatile supplemental enhancement information messages for coded video bitstreams, Recommendation ITU-T Rec. H.274 | ISO/IEC 23002-7, Aug. 2020, 86 pages.

Document: JVET-S2007-v7, Boyce, J., et al., "Versatile supplemental enhancement information messages for coded video bitstreams (Draft 5)," Joint Video Experts Team (JVET) of ITU-T SG 16 WP 3 and ISO/IEC JTC 1/SC 29/WG 11 18th Meeting: by teleconference, Apr. 15-24, 2020, 85 pages.

ISO/IEC 14496-12: "Information technology—Coding of audio-visual objects—Part 12: ISO base media file format, Technical Corrigendum 1" Jun. 3, 2016, 303 pages.

ISO/IEC 23009-1: "Information technology—Dynamic adaptive streaming over http (Dash)—Part 1: Media presentation description and segment formats," ISO/IEC JTC1/SC29/WG11 MPEG2019/m52458, Jan. 2020, 287 pages.

ISO/IEC 14496-15: "Information technology—Coding of audio-visual objects—Part 15: Carriage of network abstraction layer (NAL) unit structured video in the ISO base media file format," ISO/IEC JTC 1/SC 29/WG 03 N00149, Feb. 26, 2021, 284 pages.

ISO/IEC 23008-12: "Information technology—High efficiency coding and media delivery in heterogeneous environments—Part 12: Image File Format," ISO/IEC 23008-12:2017/DAM 2:2021(E), 39 pages.

ISO/IEC JTC 1/SC 29/WG 03 output document N0035, "Potential improvements on Carriage of VVC and EVC in ISOBMFF," Nov. 2020, 64 pages.

ISO/IEC JTC 1/SC 29/WG 03 output document N0038, "Information technology—High efficiency coding and media delivery in heterogeneous environments—Part 12: Image File Format—Amendment 3: Support for VVC, EVC, slideshows and other improvements (CD stage)," Nov. 2020, 29 pages.

Schulzrinne, H., et al., "RTP: A Transport Protocol for Real-Time Applications," Network Working Group, RFC 3550, Jul. 2003, 104 pages.

Handley, M., et al., "SDP: Session Description Protocol," Network Working Group, RFC 4566, Jul. 2006, 49 pages.

Wang, Y.K., et al., "RTP Payload Format for H.264 Video," Network Working Group, RFC 6184, May 2011, 101 pages.

Wenger, S., et al., "RTP Payload Format for Scalable Video Coding," Internet Engineering Task Force (IETF), RFC 6190, May 2011, 100 pages.

Wang, Y.K., et al., "RTP Payload Format for High Efficiency Video Coding (HEVC)," Internet Engineering Task Force (IETF) RFC 7798, Mar. 2016, 86 pages.

Zhao, S., et al., "RTP Payload Format for Versatile Video Coding (VVC)," draft-ietf-avtcore-rtp-vvc-06, Dec. 8, 2020, 121 pages.

Document: JVET-T0066, Skupin, R., et al., "AHG9: IRAP only HRD SEI message," Joint Video Experts Team (JVET) of ITU-T SG 16 WP 3 and ISO/IEC JTC 1/SC 29 20th Meeting, by teleconference, Oct. 7-16, 2020, 16 pages.

(56) References Cited

OTHER PUBLICATIONS

JVET-S0163-v2, Hannuksela, M., et al., "AHG9: On target OLS and sublayers for decoding," Joint Video Experts Team (JVET) of ITU-T SG 16 WP 3 and ISO/IEC JTC 1/SC 29/WG 11 19th Meeting: by teleconference, Jun. 22-Jul. 1, 2020, 8 pages.

Document: JVET-Q0485-v1, Wan, W., et al., "Profile and Level Definitions," Joint Video Experts Team (JVET) of ITU-T SG 16 WP 3 and ISO/IEC JTC 1/SC 29/WG 11 17th Meeting: Brussels, BE, Jan. 7-17, 2020, 5 pages.

Rainer, B., et al., "A Seamless Web Integration of Adaptive HTTP Streaming," 20th European Signal Processing Conference (EUSIPCO 2012), Aug. 27-31, 2012, 6 pages.

International Search Report from PCT Application No. PCT/CN2021/140741 dated Mar. 2, 2022, 10 pages.

International Search Report from PCT Application No. PCT/CN2021/140742 dated Mar. 22, 2022, 8 pages.

Non-Final Office Action from U.S. Appl. No. 18/339,038 dated Dec. 4, 2024, 22 pages.

\* cited by examiner

VIDEO DECODER INITIALIZATION INFORMATION CONSTRAINTS

CROSS-REFERENCE TO RELATED APPLICATIONS

This application is a continuation of International Patent Application No. PCT/CN2021/140742 filed on Dec. 23, 2021, which claims the priority to and benefits of International Application No. PCT/CN2020/138662 filed Dec. 23, 2020, by Ye-Kui Wang, et al., and titled "Video Decoder Initialization Information," and International Application No. PCT/CN2021/070411 filed Jan. 6, 2021, by Ye-Kui Wang, et al., and titled "Video Decoder Initialization Information." All the aforementioned patent applications are hereby incorporated by reference in their entireties.

TECHNICAL FIELD

The present disclosure relates to generation, storage, and consumption of digital audio video media information in a file format.

BACKGROUND

Digital video accounts for the largest bandwidth used on the Internet and other digital communication networks. As the number of connected user devices capable of receiving and displaying video increases, the bandwidth demand for digital video usage is likely to continue to grow.

SUMMARY

A first aspect relates to a method for processing video data comprising: signaling video decoder initialization information containing a range of initialization parameters for a plurality of video units when the plurality of video units are coded according to a same video codec and a same profile; and performing a conversion between a visual media data and a visual media data file based on the range of initialization parameters.

Optionally, in any of the preceding aspects, another implementation of the aspect provides that the plurality of video units include bitstreams containing coded video sequences, and wherein the video decoder initialization information is only signaled when the coded video sequences are coded according to the same video codec and when the coded video sequences conform to the same profile.

Optionally, in any of the preceding aspects, another implementation of the aspect provides that the plurality of video units include video tracks, wherein the decoder initialization information is signaled in a file level box or a movie level box of an International Organization for Standardization (ISO) base media file format (ISOBMFF) file, and wherein the video decoder initialization information applies to one or more sets of alternative video tracks that use the same profile of the same video codec.

Optionally, in any of the preceding aspects, another implementation of the aspect provides that the plurality of video units include video tracks, wherein the decoder initialization information is signaled in a file level box or a movie level box of an ISOBMFF file, and wherein the video decoder initialization information applies to all video tracks that use the same profile of the same video codec.

Optionally, in any of the preceding aspects, another implementation of the aspect provides that the plurality of video units include sample entries in a video track, wherein the decoder initialization information is signaled in a track level box of an ISOBMFF file, and wherein the decoder initialization information applies to the video track.

Optionally, in any of the preceding aspects, another implementation of the aspect provides that all sample entries of the video track are required to indicate the same profile of the same video codec.

Optionally, in any of the preceding aspects, another implementation of the aspect provides that the decoder initialization information is signaled in a track group box of an ISOBMFF file, and wherein a presence of the decoder initialization information indicates that the video track is part of a group of video tracks that all use the same profile of the same video codec and share a same decoder initialization information.

Optionally, in any of the preceding aspects, another implementation of the aspect provides that a presence of the decoder initialization information indicates that all sample entries in all tracks in the group of video tracks use the same profile of the same video codec and share a same decoder initialization information.

Optionally, in any of the preceding aspects, another implementation of the aspect provides that the decoder initialization information is signaled in a track level box of an ISOBMFF file, and wherein the decoder initialization information indicates a current track and all tracks indicated as alternative tracks to the current track use the same profile of the same video codec and share a same decoder initialization information.

Optionally, in any of the preceding aspects, another implementation of the aspect provides that the plurality of video units include representations in an adaptation set, and wherein the video decoder initialization information is only signaled when the representations are coded according to the same video codec and when the representations conform to the same profile.

Optionally, in any of the preceding aspects, another implementation of the aspect provides that the decoder initialization information is signaled in an adaptation set in a Dynamic Adaptive Streaming over Hypertext Transfer Protocol (DASH) Media Presentation Description (MPD), and wherein the decoder initialization information applies to all representations in the adaptation set that use the same profile of the same video codec.

Optionally, in any of the preceding aspects, another implementation of the aspect provides that a presence of the decoder initialization information indicates that all representations of the adaptation set use the same profile of the same video codec.

Optionally, in any of the preceding aspects, another implementation of the aspect provides that the decoder initialization information includes a maximum number of decoded pictures (maxDecPics) stored in a decoded picture buffer (DPB) when decoding a bitstream, a maximum decoded picture width (maxDecPicW) of coded pictures in the bitstream, a maximum decoded picture height (maxDecPicH) of coded pictures in the bitstream, or combinations thereof.

Optionally, in any of the preceding aspects, another implementation of the aspect provides that the decoder initialization information includes an indication of usage of inter-layer prediction, reference picture resampling, wrap-around motion compensation, motion vector prediction from reference pictures, palette coding mode, adaptive color transform, intra block copy, adaptive loop filter (ALF) adaptation parameter set (APS) network abstraction layer (NAL) unit, luma mapping with chroma scaling (LMCS) APS NAL unit, scaling list APS NAL unit, or combinations thereof in a corresponding bitstream.

Optionally, in any of the preceding aspects, another implementation of the aspect provides that the decoder initialization information includes an indication of a maximum picture order count between a current picture and a corresponding reference picture.

Optionally, in any of the preceding aspects, another implementation of the aspect provides that the decoder initialization information includes an indication of maximum color format, maximum bit depth, maximum coded picture buffer size, minimum coding unit (CU) size, scaling ratio calculation information, or combinations thereof.

Optionally, in any of the preceding aspects, another implementation of the aspect provides that the decoder initialization information includes an indication of usage of deblocking, padding, sub-picture partitioning, slice partitioning, tile partitioning, wrap-around motion compensation, reference picture resampling, long term reference pictures, or combinations thereof.

Optionally, in any of the preceding aspects, another implementation of the aspect provides that the decoder initialization information includes a maximum tier to which all coded video sequences (CVSs) of a corresponding bitstream conform, a maximum level to which all CVSs of a corresponding bitstream conform, or combinations thereof.

Optionally, in any of the preceding aspects, another implementation of the aspect provides that the decoder initialization information includes an indication of a video codec used to perform the conversion between the visual media data and the visual media data file.

Optionally, in any of the preceding aspects, another implementation of the aspect provides that the decoder initialization information includes a profile to which all bitstreams conform.

Optionally, in any of the preceding aspects, another implementation of the aspect provides that the conversion comprises generating the visual media data file according to the visual media data.

Optionally, in any of the preceding aspects, another implementation of the aspect provides that the conversion comprises parsing the visual media data file to obtain the visual media data.

A second aspect relates to an apparatus for processing video data comprising a processor and a non-transitory memory with instructions thereon, wherein the instructions upon execution by the processor, cause the processor to perform the method of any of the preceding aspects.

A third aspect relates to a non-transitory computer readable medium comprising a computer program product for use by a video coding device, the computer program product comprising computer executable instructions stored on the non-transitory computer readable medium such that when executed by a processor cause the video coding device to perform the method of any of the preceding aspects.

For the purpose of clarity, any one of the foregoing embodiments may be combined with any one or more of the other foregoing embodiments to create a new embodiment within the scope of the present disclosure.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
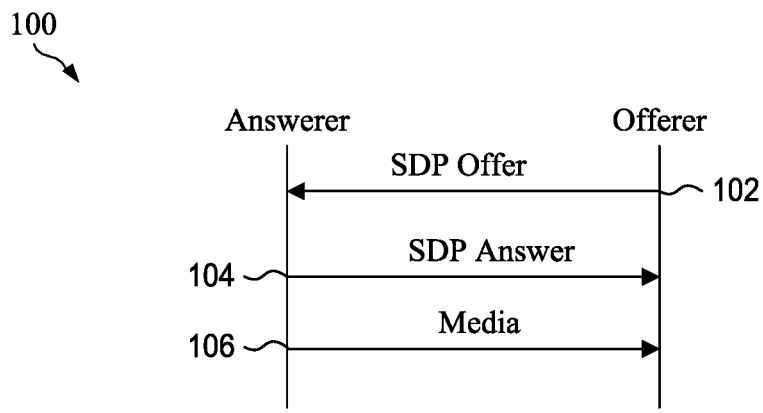
FIG. 1 is a protocol diagram of an example mechanism for establishing a communication session with SDP.

It should be understood at the outset that although an illustrative implementation of one or more embodiments are provided below, the disclosed systems and/or methods may be implemented using any number of techniques, whether currently known or yet to be developed. The disclosure should in no way be limited to the illustrative implementations, drawings, and techniques illustrated below, including the exemplary designs and implementations illustrated and described herein, but may be modified within the scope of the appended claims along with their full scope of equivalents.

Versatile Video Coding (VVC), also known as H.266, terminology is used in some description only for ease of understanding and not for limiting scope of the disclosed techniques. As such, the techniques described herein are applicable to other video codec protocols and designs also. In the present disclosure, editing changes are shown to text by strikethrough indicating cancelled text and italics indicating added text, with respect to the current draft of the VVC specification or International Organization for Standardization (ISO) base media file format (ISOBMFF) file format specification.

The present disclosure is related to video coding, video file format, video signaling, and video applications. Specifically, this disclosure is related to signaling of video decoder initialization information and the use of such signaling for decoder initialization and reinitialization. This can help avoid and/or reduce the occurrences of video decoder reinitialization during an application session, and thus helping improve user experience. The disclosed examples may be applied individually or in various combinations, for video bitstreams coded by any codec, such as the VVC standard, and for any video file format, such as the VVC video file format. The disclosed examples can also be used in various video applications, including streaming applications based on Dynamic Adaptive Streaming over HTTP (DASH) and conversational applications using Session Description Protocol (SDP)-based signaling.

The present disclosure includes the following abbreviations. Adaptive color transform (ACT), adaptive loop filter (ALF), adaptive motion vector resolution (AMVR), adaptation parameter set (APS), access unit (AU), access unit delimiter (AUD), advanced video coding (Rec. ITU-T H.264|ISO/IEC 14496-10) (AVC), bi-predictive (B), bi-prediction with CU-level weights (BCW), bi-directional optical flow (BDOF), block-based delta pulse code modulation (BDPCM), buffering period (BP), context-based adaptive binary arithmetic coding (CABAC), coding block (CB), constant bit rate (CBR), cross-component adaptive loop filter (CCALF), coded picture buffer (CPB), clean random access (CRA), cyclic redundancy check (CRC), coding tree block (CTB), coding tree unit (CTU), coding unit (CU), coded video sequence (CVS), decoding capability information (DCI), decoding initialization information (DII), decoded picture buffer (DPB), dependent random access point (DRAP), decoding unit (DU), decoding unit information (DUI), exponential-Golomb (EG), k-th order exponential-Golomb (EGk), end of bitstream (EOB), end of sequence (EOS), filler data (FD), first-in, first-out (FIFO), fixed-length (FL), green, blue, and red (GBR), general constraints information (GCI), gradual decoding refresh (GDR), geometric partitioning mode (GPM), high efficiency video coding, also known as Rec. ITU-T H.265|ISO/IEC 23008-2, (HEVC), hypothetical reference decoder (HRD), hypothetical stream scheduler (HSS), intra (I), intra block copy (IBC), instantaneous decoding refresh (IDR), inter-layer reference picture (ILRP), intra random access point (RAP), low frequency non-separable transform (LFNST), least probable symbol (LPS), least significant bit (LSB), long-term reference picture (LTRP), luma mapping with chroma scaling (LMCS), matrix-based intra prediction (MIP), most probable symbol (MPS), most significant bit (MSB), multiple transform selection (MTS), motion vector prediction (MVP), network abstraction layer (NAL), output layer set (OLS), operation point (OP), operating point information (OPI), predictive (P), picture header (PH), picture order count (POC), picture parameter set (PPS), prediction refinement with optical flow (PROF), picture timing (PT), picture unit (PU), quantization parameter (QP), random access decodable leading picture (RADL), random access skipped leading picture (RASL), raw byte sequence payload (RBSP), red, green, and blue (RGB), reference picture list (RPL), sample adaptive offset (SAO), sample aspect ratio (SAR), scalable video coding (SVC), supplemental enhancement information (SEI), slice header (SH), subpicture level information (SLI), string of data bits (SODB), sequence parameter set (SPS), short-term reference picture (STRP), step-wise temporal sublayer access (STSA), truncated rice (TR), variable bit rate (VBR), video coding layer (VCL), video parameter set (VPS), versatile supplemental enhancement information, also known as Rec. ITU-T H.274|ISO/IEC 23002-7, (VSEI), video usability information (VUI), and versatile video coding, also known as Rec. ITU-T H.266|ISO/IEC 23090-3, (VVC).

Video coding standards have evolved primarily through the development of the ITU-T and ISO/IEC standards. The ITU-T produced H.261 and H.263, ISO/IEC produced MPEG-1 and MPEG-4 Visual, and the two organizations jointly produced the H.262/MPEG-2 Video and H.264/MPEG-4 Advanced Video Coding (AVC) and H.265/HEVC standards. Since H.262, the video coding standards are based on the hybrid video coding structure wherein temporal prediction plus transform coding are utilized. To explore the further video coding technologies beyond HEVC, the Joint Video Exploration Team (JVET) was founded by Video Coding Experts Group (VCEG) and MPEG jointly. Many methods have been adopted by JVET and put into the reference software named Joint Exploration Model (JEM). The JVET was later renamed to be the Joint Video Experts Team (JVET) when the Versatile Video Coding (VVC) project officially started. VVC is a coding standard targeting a 50% bitrate reduction as compared to HEVC. VVC has been finalized by the JVET.

The Essential Video Coding (EVC) standard (ISO/IEC 23094-1) is another video coding standard developed by MPEG.

Decoding capability information (DCI) in VVC is discussed below. The DCI NAL unit is a portion of a video coding bitstream that contains bitstream-level profile, tier, and level (PTL) information. The DCI NAL unit includes one or more PTL syntax structures that can be used during session negotiation between a sender and a receiver of a VVC bitstream. When the DCI NAL unit is present in a VVC bitstream, each output layer set (OLS) in the CVSs of the bitstream shall conform to the PTL information carried in at least one of the PTL structures in the DCI NAL unit.

In AVC and HEVC, the PTL information for session negotiation is available in the SPS (for HEVC and AVC) and in the VPS (for HEVC layered extension). This design of conveying the PTL information for session negotiation in HEVC and AVC may have certain disadvantages because the scope of a SPS and a VPS is within a CVS, instead of the whole bitstream. Because of that, a sender-receiver session initiation may suffer from reinitialization during bitstream streaming at every new CVS. DCI solves this problem since the DCU NAL unit carries bitstream-level information. Thus, the compliance to the indicated decoding capability can be guaranteed until the end of the bitstream.

File format standards are discussed below. Media streaming applications are typically based on the Internet Protocol (IP), Transmission Control Protocol (TCP), and Hypertext Transfer Protocol (HTTP) transport methods, and typically rely on a file format such as the ISOBMFF. One such streaming system is dynamic adaptive streaming over HTTP (DASH). Video can be encoded in a video format, such as AVC and/or HEVC. The encoded video can be encapsulated in ISOBMFF tracks and included in DASH representations and segments. Important information about the video bitstreams, such as the profile, tier, and level, and many others, may be exposed as file format level metadata and/or in a DASH media presentation description (MPD) for content selection purposes. For example, such information can be used for selection of appropriate media segments both for initialization at the beginning of a streaming session and for stream adaptation during the streaming session.

Similarly, when using an image format with ISOBMFF, a file format specification specific to the image format, such as the AVC image file format and the HEVC image file format, may be employed. The VVC video file format, the file format for storage of VVC video content based on ISOBMFF, is under development by MPEG. The VVC image file format, the file format for storage of image content coded using VVC, based on ISOBMFF, is also under development by MPEG.

DASH is discussed below. DASH supports the creation of multiple representations for video and/or audio data of multimedia content. Different representations may correspond to different coding characteristics, such as different profiles or levels of a video coding standard, different bitrates, different spatial resolutions, etc. DASH employs a manifest of such representations defined in a Media Presentation Description (MPD) data structure. A media presentation may correspond to a structured collection of data that is accessible to DASH streaming client device. The DASH streaming client device may request and download media data information to present a streaming service to a user of the client device. A media presentation may be described in the MPD data structure, which may include updates of the MPD.

A media presentation may contain a sequence of one or more periods. Each period may extend until the start of the next period, or until the end of the media presentation in the case of the last period. Each period may contain one or more representations for the same media content. A representation may be one of a number of alternative encoded versions of audio, video, timed text, or other such data. The representations may differ by encoding types, e.g., by bitrate, resolution, and/or codec for video data and bitrate, language, and/or codec for audio data. The term representation may be used to refer to a section of encoded audio or video data corresponding to a particular period of the multimedia content and encoded in a particular way.

Representations of a particular period may be assigned to a group indicated by an attribute in the MPD indicative of an adaptation set to which the representations belong. Representations in the same adaptation set are generally considered alternatives to each other, in that a client device can dynamically and seamlessly switch between these representations, e.g., to perform bandwidth adaptation. For example, each representation of video data for a particular period may be assigned to the same adaptation set. Any of the representations may be selected for decoding to present media data, such as video data or audio data, of the multimedia content for the corresponding period. The media content within one period may be represented by either one representation from group 0, if present, or the combination of at most one representation from each non-zero group, in some examples. Timing data for each representation of a period may be expressed relative to the start time of the period.

A representation may include one or more segments. Each representation may include an initialization segment, or each segment of a representation may be self-initializing. When present, the initialization segment may contain initialization information for accessing the representation. In general, the initialization segment does not contain media data. A segment may be uniquely referenced by an identifier, such as a uniform resource locator (URL), uniform resource name (URN), or uniform resource identifier (URI). The MPD may provide the identifiers for each segment. In some examples, the MPD may also provide byte ranges in the form of a range attribute, which may correspond to the data for a segment within a file accessible by the URL, URN, or URI.

Different representations may be selected for substantially simultaneous retrieval for different types of media data. For example, a client device may select an audio representation, a video representation, and a timed text representation from which to retrieve segments. In some examples, the client device may select particular adaptation sets for performing bandwidth adaptation. For example, the client device may select an adaptation set including video representations, an adaptation set including audio representations, and/or an adaptation set including timed text. The client device may also select adaptation sets for certain types of media (e.g., video), and directly select representations for other types of media (e.g., audio and/or timed text).

An example DASH streaming procedure is shown by the following steps. The client obtains the MPD. The client estimates the downlink bandwidth. The client selects a video representation and an audio representation according to the estimated downlink bandwidth and the codec, decoding capability, display size, audio language setting, etc. Unless the end of the media presentation is reached, the client continues to request media segments of the selected representations and presents the streaming content to the user. The client keeps estimating the downlink bandwidth. When the bandwidth changes significantly (e.g., becomes lower), the client selects a different video representation to match the newly estimated bandwidth, and continues to request media segments from the newly selected representation.

Video real-time transport protocol (RTP) payload formats and session description protocol (SDP) is discussed below. For any video codec used in video applications, for example VVC, that employs the RTP, an RTP payload format should be specified. Further, a mechanism for signaling of media type parameters using the SDP should also be specified. The RTP payload format for a video codec mainly specifies how to encapsulate the coded video bitstreams in RTP packets and RTP streams. The RTP payload formats for AVC, SVC, and HEVC are specified in Internet Engineering Task Force (IETF) Request for Comments (RFC) 6184, RFC 6190, and RFC 7798, respectively. For VVC, the RTP payload is under development by the IETF.

The following are example technical problems solved by disclosed technical solutions. Current video coding and communications standards and systems lack a mechanism to signal video decoder initialization information. For example, in adaptive streaming, the streaming client often requests to switch to a different bitstream with a different spatial resolution for adapting to the changing network conditions, for example due to changing bandwidth. Different bitstreams may be stored in different file format (FF) tracks and encapsulated in different DASH representations within the same Adaptation Set. Thus, such bitstream switching typically involves switching between FF tracks and DASH Representations. In many cases, the switch-to bitstream is of the same codec (e.g., VVC) and the same profile (e.g., VVC Main 10 profile) as the switch-from bitstream. Depending on the availability of other information such as the greatest spatial resolution and how the decoder is implemented, when the spatial resolution changes, particularly to be larger, a decoder may be reinitialized. Decoder initialization or reinitialization typically takes 100-200 milliseconds (ms) of time. In the best case, initialization or reinitialization can be just 16 ms, depending on various factors including memory allocation time, secure/nonsecure, mapping time, memory fragmentation of double data rate (DDR) memory, internal fragmentation of system memory management unit (SMMU) etc. Consequently, decoder reinitialization can disrupt a streaming session, affect playback continuity, etc. It is therefore useful to signal information to be used by the video decoder for decoder initialization such that video decoder reinitialization can be avoided or reduced as much as possible in an application session to maximize user experience.

Disclosed herein are mechanisms to address one or more of the problems listed above. As a specific example, a decoder may be configured to stream video data by dynamically selecting from a set of tracks containing bitstreams according to the DASH protocol. In such an example, the decoder can select segments from the tracks based on changing network conditions. A decoder reinitialization may be triggered when settings for decoding a current track segment are insufficient to support decoding a next track segment in a newly selected track. The disclosed mechanisms support minimizing and/or eliminating such reinitializations. For example, an encoder or an intermediate storage server can signal decoder initialization information to the decoder. The decoder initialization information can describe the memory constraints, coding tools, and/or other settings used when encoding each of a set of related tracks and/or bitstreams. The decoder can use this information to mitigate reinitialization. For example, the decoder can be initialized based on the most stringent set of memory constraints, coding tools, and/or settings used by the various tracks/bitstreams. In this way, the most stringent settings support decoding each of the tracks/bitstreams that the decoder may select. As a specific example, each track may contain a bitstream of pictures coded at a different resolution. The decoder can select different tracks to increase or decrease resolution based on current network conditions. When decoding, the decoder allocates memory in a decoded picture buffer for storing reference pictures for use in inter-prediction. The amount of memory allocated may vary depending on resolution. As such, the decoder may select the memory allocation parameters associated with the highest resolution track during initialization. In this way, the memory allocation is sufficient to support decoding any of the tracks, and hence reinitialization is not needed. Many different parameters can be used in coding a bitstream for inclusion in a track. A non-exhaustive list of parameters that can be used as decoder initialization information for decoder initialization is included below.

The decoder initialization information can be signaled in various locations, depending on the example implementation. For example, the decoder initialization information can be signaled at the bitstream level, such as in a DCI NAL unit and/or in a DII SEI message in one or more of the bitstreams. In another example, the decoder initialization information can be signaled at the file format level, such as in a file-level box, a movie-level box, and/or a track-level box that describes the track(s) in a ISOBMFF file. In another example, the decoder initialization information can be signaled at the communication protocol level, such as in a DASH MPD describing the representations containing the tracks. In another example, the decoder initialization information can be signaled at the communication session level, such as in a RTP header extension, a SDP offer, and/or a SDP answer describing the data that can be requested as part of the communication session.

In an example, the decoder may be unable to avoid reinitialization when a selected bitstream is coded with a different codec and/or based on a different profile than the current bitstream. As such, in some examples the decoder initialization information is only signaled for bitstreams, tracks, and/or representations that are all coded according to the same codec and profile. Further, the decoder may perform a reinitialization whenever a selected bitstream, track, and/or representation would require a change in codec, profile, HRD parameters, and/or timing parameters.

To solve the above problems, and others, methods as summarized below are disclosed. The items should be considered as examples to explain the general concepts and should not be interpreted in a narrow way. Furthermore, these items can be applied individually or combined in any manner.

Example 1

Certain video decoder initialization information is signaled to the video decoder. In one example, the decoder initialization information includes at least one or more of the following parameters. The maximum number of decoded pictures (maxDecPics) stored in the DPB when decoding the bitstream; the maximum decoded picture width (maxDecPicW) of all coded pictures in the bitstream in luma samples; the maximum decoded picture height (maxDecPicH) of all coded pictures in the bitstream in luma samples; whether certain coding tools and/or certain NAL units are enabled/used when decoding the bitstream may be signaled as decoder initialization information; and/or a max POC distance between the current picture and its reference pictures when decoding the bitstream.

In one example, the certain coding tools may be one or more of the following: inter-layer prediction, reference picture resampling (RPR) or adaptive resolution, wrap around motion compensation, motion prediction from reference pictures (e.g., temporal motion vector prediction (TMVP) or subblock based temporal motion vector prediction (SbTMVP)), palette, adaptive color transform (ACT), and/or intra block copy (IBC). In one example, the certain NAL unit may be one or more of the following: ALF APS NAL unit, LMCS APS NAL unit, or scaling list APS NAL unit.

Example 2

When some video decoder initialization information is available to the decoder for decoding of the bitstream, the decoder is initialized based on the decoder initialization information. In one example, the decoder is initialized such that the DPB contains at least maxDecPics picture slots with one slot available for each decoded picture. In one example, the decoder is initialized such that the width of each picture slot of the DPB is at least maxDecPicW luma samples. In one example, the decoder is initialized such that the height of each picture slot of the DPB is at least maxDecPicH luma samples.

Example 3

In one example, the video decoder initialization information is signaled in the DCI NAL unit as specified in VVC. Further, one or more of the following items may also apply. In one example, the parameters of the decoder initialization information are only present in the DCI NAL unit when all CVSs of the bitstream conform to one profile and one tier. In one example, the parameters of the decoder initialization information are only present in the DCI NAL unit when there is only one profile_tier_level( ) syntax structure in the DCI NAL unit. In one example, the decoder initialization information includes at least one or more of the following parameters. The maximum number of decoded pictures (maxDecPics) stored in the DPB when decoding the bitstream; the maximum decoded picture width (maxDecPicW) of all coded pictures in the bitstream in luma samples; the maximum decoded picture height (maxDecPicH) of all coded pictures in the bitstream in luma samples; the maximum color format (e.g., the greatest value of sps_chroma_format_idc) of all coded pictures in the bitstream; the maximum bit depth (e.g., the greatest value of sps_bitdepth_minus8) of all coded pictures in the bitstream; the maximum coded picture buffer (CPB) size, in bits, for the bitstream; whether ALF APS NAL units are enabled/used for the bitstream; whether explicit scaling list APS NAL units are enabled/used for the bitstream; whether LMCS APS NAL units are enabled/used for the bitstream; whether temporal motion vector prediction is enabled/used for the bitstream (e.g., yes if the value of sps_temporal_mvp_enabled_flag is equal to 1 for any of the referenced SPSs for the bitstream); whether the intra block copy (IBC)

is enabled/used for the bitstream; whether the palette coding mode is enabled/used for the bitstream; whether the adaptive color transform is enabled/used for the bitstream; whether deblocking is enabled/used for the bitstream (e.g., no if the value of deblocking_filter_override_enabled_flag and pps_deblocking_filter_disabled_flag are equal to 0 for any of the referenced PPSs for the bitstream); the minimum CU size information (e.g., indicated by sps_log 2_min_luma_coding_block_size_minus2; note that TMVP storage granularity may depend on minimum CU size); an indication of which padding method is enabled/used for motion compensation (note that this can be useful in a video codec design that supports multiple padding method for motion compensation); whether sub-picture partitioning is enabled/used for the bitstream; whether slice partitioning is enabled/used for the bitstream; whether tile partitioning is enabled/used for the bitstream; whether wrap-around motion compensation (e.g., indicated by sps_ref_wraparound_enabled_flag) is enabled/used; whether the reference pictures resampling is enabled/used (indicated by sps_ref_pic_resampling_enabled_flag); the offsets/variations that are applied to the picture size for scaling ratio calculation (indicated by pps_sclaing_win_left_offset/ pps_sclaing_win_right_offset/ pps_sclaing_win_top_offset/ pps_sclaing_win_bottom_offset); and/or whether long term reference pictures are enabled/used for inter prediction (indicated by sps_long_term_ref_pics_flag) may be included in the decoder initialization information.

Example 4

In one example, the video decoder initialization information is signaled in an SEI message. For example, the decoder initialization information can be signaled in a messaged named the decoder initialization information (DII) SEI message. Further, one or more of the following items apply. In one example, the DII SEI message may be used with a video bitstream coded using any video codec, such as VVC, HEVC, AVC, EVC, Audio Video Coding Standard (AVS), Alliance for Open Media (AOMedia) Video 1 (AV1), AOMedia Video 2 (AV2), video coding format one (VC1) also known as Society of Motion Picture and Television Engineers (SMPTE) 421, or combinations thereof. In one example, the information provided in the DII SEI message applies to the entire bitstream. In one example, when present in a bitstream, the DII SEI message shall be present in the first AU of the bitstream, and may also be present in other AUs of the bitstream, such as IRAP AUs. In one example, the DII SEI message may be provided in the bitstream or provided through an external mechanism. In one example, the DII SEI message may only be used with a video bitstream when all CVSs of the bitstream are indicated to conform to the same profile. In one example, the DII SEI message may only be used with a video bitstream when all CVSs of the bitstream are indicated to conform to the same profile, and, for VVC and HEVC, all CVSs of the bitstream are indicated to conform to the same tier. In one example, the DII SEI message may only be used with a video bitstream when all CVSs of the bitstream conform to one profile. In one example, the DII SEI message may only be used with a video bitstream when all CVSs of the bitstream conform to one profile and, for VVC and HEVC, all CVSs of the bitstream conform to one tier.

In one example, the DII SEI message includes syntax elements that indicate at least one or more of the following parameters. The maximum tier to which all CVSs of the bitstream conform; the maximum level to which all CVSs of the bitstream conform; the maximum number of decoded pictures (maxDecPics) stored in the DPB when decoding the bitstream; the maximum decoded picture width (maxDecPicW) of all coded pictures in the bitstream in luma samples; the maximum decoded picture height (maxDecPicH) of all coded pictures in the bitstream in luma samples; the maximum color format (e.g., the greatest value of sps_chroma_format_idc in VVC or chroma_format_idc in HEVC or AVC) of all coded pictures in the bitstream; the maximum bit depth (e.g., the greatest value of sps_bitdepth_minus8 in VVC or the greatest value of bit_depth_luma_minus8 and bit_depth_chroma_minus8 in HEVC or AVC) of all coded pictures in the bitstream; the maximum luma bit depth (e.g., the greatest value of sps_bitdepth_minus8 in VVC or the greatest value of bit_depth_luma_minus8 in HEVC or AVC) of all coded pictures in the bitstream; the maximum chroma bit depth (e.g., the greatest value of sps_bitdepth_minus8 in VVC or the greatest value of bit_depth_chroma_minus8 in HEVC or AVC) of all coded pictures in the bitstream; the maximum CPB size, in bits, for the bitstream; whether ALF APS NAL units are enabled/used for the bitstream (for codecs, e.g., HEVC and AVC, not supporting ALF APSs, this is no); whether explicit scaling list APS NAL units are enabled/used for the bitstream (for codecs, e.g., HEVC and AVC, not supporting ALF APSs, this is no); whether LMCS APS NAL units are enabled/used for the bitstream (for codecs, e.g., HEVC and AVC, not supporting ALF APSs, this is no); whether temporal motion vector prediction is enabled/used for the bitstream (e.g., for VVC, this is the greatest value of sps_temporal_mvp_enabled_flag); whether the intra block copy (IBC) is enabled/used for the bitstream; whether the palette coding mode is used for the bitstream (for codecs, e.g., AVC, not supporting a palette coding mode, this is no); whether the adaptive color transform is enabled/used for the bitstream (for codecs, e.g., for AVC, not supporting an adaptive color transform, this is no); whether deblocking is enabled/used for the bitstream (for codecs, e.g., HEVC and VVC, no if the value of deblocking_filter_override_enabled_flag and pps_deblocking_filter_disabled_flag are equal to 0 for any of the referenced PPSs for the bitstream); the minimum CU size information (e.g., indicated by sps_log 2_min_luma_coding_block_size_minus2, note that TMVP storage granularity may depend on minimum CU size); an indication of which padding method is enabled/used for motion compensation (note that this can be useful in a video codec design that supports multiple padding method for motion compensation); whether sub-picture partitioning is enabled/used for the bitstream; whether slice partitioning is enabled/used for the bitstream; whether tile partitioning is enabled/used for the bitstream; whether wrap-around motion compensation (e.g., indicated by sps_ref_wraparound_enabled_flag) is enabled/used; whether the reference pictures resampling is enabled/used (indicated by sps_ref_pic_resampling_enabled_flag); the offsets/variations that are applied to the picture size for scaling ratio calculation (Indicated by pps_sclaing_win_left_offset/ pps_sclaing_win_right_offset/ pps_sclaing_win_top_offset/ pps_sclaing_win_bottom_offset); and/or whether long term reference pictures are enabled/used for inter prediction (indicated by sps_long_term_ref_pics_flag) may be included in the DII SEI message.

Example 5

In one example, the video DII is signaled in an ISOBMFF file or a file according to a file format derived from and compatible to ISOBMFF. Further, one or more of the following items may apply. In one example, different sets of DII are signaled in a file-level or movie-level box, and each DII set apply to one or more sets of alternative video tracks in the file. In one example, the DII is signaled in a file-level metadata box. In one example, the DII is signaled in a movie-level metadata box. In one example, the DII is signaled in a movie header box. In one example, the DII is signaled in a file-level or movie box and applies to all video tracks in the file. In one example, the DII is signaled in a file-level metadata box. In one example, the DII is signaled in a movie-level metadata box. In one example, the DII is signaled in a movie header box. In one example, the DII is signaled in a track-level box for a video track or an image sequence track and applies to the entire video track. In one example, the DII is signaled in the sample description box, and when there are multiple sample entries, the DII is required to be the same for all the sample entries. In one example, the DII is signaled in the track header box. In one example, the DII is signaled in the track group box. In one example, the DII is signaled in the track group type box, and a grouping type, e.g., 'sdii' is defined, indicating that this track belongs to a group of tracks that share the same DII. The tracks that have the same value of track_group_id within a TrackGroupTypeBox of track_group_type 'sdii' are mapped as sharing the same DII. In one example, the DII is signaled in a track-level metadata box. In one example, the DII is signaled in a track-level box and applies to the current track and all other tracks that are indicated as alternative tracks of the current track. In one example, the DII is signaled in the sample description box, and when there are multiple sample entries, the DII is required to be the same for all the sample entries. In one example, furthermore, the DII is signaled in the track header box. In one example, the DII is signaled in a track-level metadata box.

In one example, the DII may only be signaled for a file or a track or a group of tracks or a set of alternative tracks when all CVSs of the bitstreams are indicated to use the same video codec. In one example, the DII may only be signaled for a file or a track or a group of tracks or a set of alternative tracks when all CVSs of the bitstreams are indicated to conform to the same profile. In one example, the DII may only be signaled for a file or a track or a group of tracks or a set of alternative tracks when all CVSs of the bitstreams are indicated to conform to the same profile, and, for VVC and HEVC, all CVSs of the bitstream are indicated to conform to the same tier. In one example, the DII may only be signaled for a file or a track or a group of tracks or a set of alternative tracks when all CVSs of the bitstreams conform to one profile. In one example, the DII may only be signaled for a file or a track or a group of tracks or a set of alternative tracks when there is one profile to which all CVSs of the bitstream conform and, for VVC and HEVC, there is one tier to which all CVSs of the bitstream conform.

In one example, the DII includes fields that indicate at least one or more of the following parameters. The video codec used to encode the bitstream(s); the profile to which the bitstream(s) conform; the maximum tier to which all CVSs of the bitstream(s) conform; the maximum level to which all CVSs of the bitstream(s) conform; the maximum number of decoded pictures (maxDecPics) stored in the DPB when decoding the bitstream(s); the maximum decoded picture width (maxDecPicW) of all coded pictures in the bitstream(s) in luma samples; the maximum decoded picture height (maxDecPicH) of all coded pictures in the bitstream(s) in luma samples; the maximum color format (e.g., the greatest value of sps_chroma_format_idc in VVC or chroma_format_idc in HEVC or AVC) of all coded pictures in the bitstream(s); the maximum bit depth (e.g., the greatest value of sps_bitdepth_minus8 in VVC or the greatest value of bit_depth_luma_minus8 and bit_depth_chroma_minus8 in HEVC or AVC) of all coded pictures in the bitstream(s); the maximum luma bit depth (e.g., the greatest value of sps_bitdepth_minus8 in VVC or the greatest value of bit_depth_luma_minus8 in HEVC or AVC) of all coded pictures in the bitstream(s); the maximum chroma bit depth (e.g., the greatest value of sps_bitdepth_minus8 in VVC or the greatest value of bit_depth_chroma_minus8 in HEVC or AVC) of all coded pictures in the bitstream(s); the maximum CPB size, in bits, for the bitstream(s); whether ALF APS NAL units are enabled/used for the bitstream(s) (for codecs, e.g., HEVC and AVC, not supporting ALF APSs, this is no); whether explicit scaling list APS NAL units are enabled/used for the bitstream(s) (for codecs, e.g., HEVC and AVC, not supporting ALF APSs, this is no); whether LMCS APS NAL units are enabled/used for the bitstream(s) (for codecs, e.g., HEVC and AVC, not supporting ALF APSs, this is no); whether temporal motion vector prediction is enabled/used for at least one of the bitstreams (e.g., for VVC, this is the greatest value of sps_temporal_mvp_enabled_flag); whether the IBC is enabled/used for at least one of the bitstreams; whether the palette coding mode is used for at least one of the bitstreams (for codecs, e.g., AVC, not supporting a palette coding mode, this is no); whether the adaptive color transform is enabled/used for at least one of the bitstreams (for codecs, e.g., for AVC, not supporting an adaptive color transform, this is no); whether deblocking is enabled/used for at least one of the bitstreams (for codecs, e.g., HEVC and VVC, no if the value of deblocking_filter_override_enabled_flag and pps_deblocking_filter_disabled_flag are equal to 0 for any of the referenced PPSs for the bitstream); the minimum CU size information (e.g., indicated by sps_log 2_min_luma_coding_block_size_minus2, note that TMVP storage granularity may depend on minimum CU size); an indication of which padding method is enabled/used for motion compensation for at least one of the bitstreams (note that this can be useful in a video codec design that supports multiple padding method for motion compensation); whether sub-picture partitioning is enabled/used for at least one of the bitstreams; whether slice partitioning is enabled/used for at least one of the bitstreams; whether tile partitioning is enabled/used for at least one of the bitstreams; whether wrap-around motion compensation (e.g., indicated by sps_ref_wraparound_enabled_flag) is enabled/used for at least one of the bitstreams; whether the reference pictures resampling is enabled/used (indicated by sps_ref_pic_resampling_enabled_flag) for at least one of the bitstreams; the offsets/variations that are applied to the picture size for scaling ratio calculation (indicated by pps_sclaing_win_left_offset/ pps_sclaing_win_right_offset/ pps_sclaing_win_top_offset/ pps_sclaing_win_bottom_offset); and/or whether long term reference pictures are enabled/used for inter prediction (indicated by sps_long_term_ref_pics_flag) for at least one of the bitstreams can be included in fields in the DII.

Example 6

In one example, the video DII is signaled in a DASH MPD. One or more of the following items may apply. In one example, the DII is signaled in an adaptation set and applies to all representations in the adaptation set. In one example, the DII is signaled in a representation and applies to the entire representation. In one example, the DII is optional and may only be signaled for an adaptation set or a representation when all CVSs of the bitstreams are indicated to use the same video codec. In one example, the DII may only be signaled for an adaptation set or a representation when all CVSs of the bitstreams are indicated to conform to the same profile. In one example, the DII may only be signaled for an adaptation set or a representation when all CVSs of the bitstreams are indicated to conform to the same profile, and, for VVC and HEVC, all CVSs of the bitstream are indicated to conform to the same tier. In one example, the DII may only be signaled for an adaptation set or a representation when there is one profile to which all CVSs of the bitstreams conform. In one example, the DII may only be signaled for an adaptation set or a representation when there is one profile to which all CVSs of the bitstream conform to, for VVC and HEVC, there is one tier to which all CVSs of the bitstream conform.

In one example, the DII includes fields that indicate at least one or more of the parameters described in Example 5.

Example 7

In one example, the video decoder initialization information is signaled in an RTP header extension or as SDP parameters used in SDP offer/answer. One or more of the following items may apply. In one example, the DII is optional and may only be signaled in the SDP lines for a particular video codec during the session negotiation (e.g., the SDP offer/answer) when the same profile for the video codec is to be used for the entire session. In one example, the DII may only be signaled when all CVSs of the bitstreams are indicated to conform to the same profile, and, for VVC and HEVC, all CVSs of the bitstream are indicated to conform to the same tier. In one example, the DII may only be signaled when there is one profile to which all CVSs of the bitstreams conform. In one example, the DII may only be signaled when there is one profile to which all CVSs of the bitstream conform and, for VVC and HEVC, there is one tier to which all CVSs of the bitstream conform. In one example, the DII is optional and may only be signaled in an RTP header extension after session negotiation when all CVSs of the bitstreams to be carried in the RTP streams in the entire session use the same video codec. In one example, the DII may only be signaled when all CVSs of the bitstreams are indicated to conform to the same profile. In one example, the DII may only be signaled when all CVSs of the bitstreams are indicated to conform to the same profile, and, for VVC and HEVC, all CVSs of the bitstream are indicated to conform to the same tier. In one example, the DII may only be signaled when there is one profile to which all CVSs of the bitstreams conform. In one example, the DII may only be signaled when there is one profile to which all CVSs of the bitstream conform and, for VVC and HEVC, there is one tier to which all CVSs of the bitstream conform.

In one example, the DII includes fields that indicate at least one or more of the parameters described in Example 5.

Example 8

The decoder may be reinitialized when the profile/level/tier information is changed. In one example, the decoder is reinitialized if one or multiple syntax element(s) of the GCI as specified in VVC is changed.

Example 9

The decoder may be reinitialized when one or multiple syntax element(s) of the general timing and HRD parameters syntax is changed.

Example 10

In one example, the video decoder initialization information (DII) is signaled in an ISOBMFF file and/or a file according to a file format derived from and compatible to ISOBMFF. One or more of the following items also apply. In one example, different sets of DII are signaled in a file-level or movie-level box, and each DII set applies to one or more sets of alternative video tracks in the file that use the same profile of the same video codec. In one example, the DII is signaled in a file-level metadata box. In one example, the DII is signaled in a movie-level metadata box. In one example, the DII is signaled in a movie header box. In one example, the DII is signaled in a file-level or movie box and applies to all video tracks in the file that use the same profile of the same video codec. In one example, the DII is signaled in a file-level metadata box. In one example, the DII is signaled in a movie-level metadata box. In one example, the DII is signaled in a movie header box. In one example, the DII is signaled in a track-level box for a video track or an image sequence track and applies to the entire video track. All sample entries in the track are required to indicate the same profile of the same video codec. In one example, the DII is signaled in the sample description box. Further, when there are multiple sample entries, the DII is required to be the same for all the sample entries. In one example, the DII is signaled in the track header box. In one example, the DII is signaled in the track group box. In one example, the DII is signaled in the track group type box. A grouping type, e.g., 'vdii' is defined, the presence of which indicates that this track belongs to a group of video tracks that share the same DII and all sample entries of all tracks in this group of tracks use the same profile of the same video codec. The tracks that have the same value of track_group_id within a TrackGroupTypeBox of track_group_type 'vdii' are mapped as sharing the same DII. In one example, the DII is signaled in the track group type box, and a grouping type, e.g., 'vdii' is defined, the presence of which indicates that this track belongs to a group of video tracks that use the same profile of the same video codec and share the same DII. In one example, the DII is signaled in a track-level metadata box. In one example, the DII is signaled in a track-level box and applies to the current track and all other tracks that are indicated as alternative tracks of the current track and are indicated to use the same profile of the same video codec as the current track. In one example, the DII is signaled in the sample description box, and when there are multiple sample entries, the DII is required to be the same for all the sample entries. In one example, the DII is signaled in the track header box. In one example, the DII is signaled in a track-level metadata box. In one example, the DII includes fields that indicate at least one or more of the parameters described in Example 5.

Example 11

In one example, the video DII is signaled in a DASH MPD. One or more of the following items apply. In one example, the DII is signaled in an adaptation set and applies to all video representations in the adaptation set that use the same profile of the same video codec. In one example, the DII is optional and may only be signaled for an adaptation set when all representations in the adaptation set use the same video codec. In one example, the presence of the DII indicates that all representations of the adaptation set use the same profile of the same video codec and share the same DII.

In one example, the DII includes fields that indicate at least one or more of the parameters described in Example 5.

Below are some example embodiments for some of the aspects summarized above, some of which can be applied to the standard specification for VVC video file format. The relevant parts that have been added or modified are denoted in underline bold and the deleted parts are denoted in bold italics.

In an example, the decoding capability information RBSP syntax is modified as follows:

|  | Descriptor |
|---|---|
| decoding_capability_information_rbsp( ) { |  |
|   dci_reserved_zero_4bits | u(4) |
|   dci_num_ptls_minus1 | u(4) |
|   for( i = 0; i <= dci_num_ptls_minus1; i++ ) |  |
|     profile_tier_level( 1, 0 ) |  |
|   dci_extension_flag | u(1) |
|   if( dci_extension_flag ) { |  |
|     while( !byte_aligned( ) ) |  |
|       dci_extension_alignment_bit_equal_to_one | u(1) |
|     dci_extension( ) |  |
|     dci_extension2_flag | u(1) |
|     if( dci_extension2_flag ) |  |
|       while( more_rbsp_data( ) ) |  |
|         dci_extension_data_flag | u(1) |
|   } |  |
|   rbsp_trailing_bits( ) |  |
| } |  |

In an example, a decoding capability information extension syntax is added as follows:

|  | Descriptor |
|---|---|
| dci_extension( ) { |  |
|   dci_max_num_dec_pics_in_dpb_minus1 | u(4) |
|   dci_max_bitdepth_minus8 | u(4) |
|   dci_max_pic_width | u(16) |
|   dci_max_pic_height | u(16) |
|   dci_max_chroma_format | u(2) |
|   dci_ext_reserved_zero_6bits | u(6) |
| } |  |

In an example, the decoding capability information RBSP semantics is modified as follows:

A DCI RBSP could be made available to the decoder, through either being present in the bitstream, included in at least the first AU of the bitstream, or provided through external means. NOTE 1—The information contained in the DCI RBSP is not necessary for operation of the decoding process specified in clauses 2 through 9 of this Specification. When present, all DCI NAL units in a bitstream shall have the same content. dci_reserved_zero_4 bits shall be equal to 0 in bitstreams conforming to this version of this Specification. The values greater than 0 for dci_reserved_zero_4 bits are reserved for future use by ITU-T|ISO/IEC. Decoders shall allow values greater than 0 for dci_reserved_zero_4 bits to appear in the bitstream and shall ignore the value of dci_reserved_zero_4 bits. dci_num_ptls_minus1 plus 1 specifies the number of profile_tier_level( ) syntax structures in the DCI NAL unit. The value of dci_num_ptls_minus1 shall be in the range of 0 to 14, inclusive. The value 15 for dci_num_ptls_minus1 is reserved for future use by ITU-T|ISO/IEC. It is a requirement of bitstream conformance that each OLS in a CVS in the bitstream shall conform to at least one of the profile_tier_level( ) syntax structures in the DCI NAL unit. NOTE 2—The DCI NAL unit could include PTL information, possibly carried in multiple profile_tier_level( ) syntax structures, that applies collectively to multiple OLSs, and does not need to include PTL information for each of the OLSs individually.

dci_extension_flag equal to 0 specifies that no dci_extension_data_flag syntax elements are dci_extension( ) syntax structure is present in the DCI RBSP syntax structure. dci_extension_flag equal to 1 specifies that dci_extension_data_flag syntax elements might be the dci_extension( ) syntax structure is present in the DCI RBSP syntax structure. dci_extension_flag shall be equal to 0 in bitstreams conforming to this version of this Specification. However, some use of dci_extension_flag equal to 1 could be specified in some future version of this Specification, and decoders conforming to this version of this Specification shall allow the value of dci_extension_flag equal to 1 to appear in the syntax. When dci_num_ptls_minus1 is greater than 0, the value of dci_extension_flag shall be equal to 0.

dci_extension_alignment_bit_equal_to_one shall be equal to 1. Alternatively, the following two lines of syntax is replaced with a 7-bit field, e.g., named dci_extension_alignment_zero_7 bits, and the value of the field is required to be equal to 0:

|  | Descriptor |
|---|---|
| while( !byte_aligned( ) ) |  |
|   dci_extension_alignment_bit_equal_to_one | u(1) | dci_extension2_flag equal to 0 specifies that no dci_extension_data_flag syntax elements are present in the DCI RBSP syntax structure. vps_extension2_flag equal to 1 specifies that dci_extension_data_flag syntax elements might be present in the DCI RBSP syntax structure. dci_extension_flag shall be equal to 0 in bitstreams conforming to this version of this Specification. However, some use of dci_extension_flag equal to 1 could be specified in some future version of this Specification, and decoders conforming to this version of this Specification shall allow the value of dci_extension_flag equal to 1 to appear in the syntax and shall ignore all data that follow the value 1 for dci_extension2_flag in a DCI RBSP.

dci_extension_data_flag could have any value. Its presence and value do not affect the decoding process specified in this version of this Specification. Decoders conforming to this version of this Specification shall ignore all dci_extension_data_flag syntax elements.

In an example, a decoding capability information extension semantics is added/modified as follows:

NOTE—When the dci_extension( ) syntax structure is present for a bitstream and the decoder is initialized according to the information provided in the DCI NAL unit, it is expected that no decoder reinitialization is needed for decoding the entire bitstream.

This embodiment can be applied to VSEI. Most relevant parts that have been added or modified are highlighted in boldface underline and some of the deleted parts are highlighted in boldface italics.

dci_max_num_dec_pics_in_dpb_minus_1 plus 1 indicates the maximum number of decoded pictures stored in the DPB at any moment when decoding the bitstream. dci_max_bitdepth_minus8 plus 8 indicates the maximum bit depth, in units of bits, of each colour component of a decoded picture when decoding the bitstream. The value of dci_max_bitdepth_minus8 shall be in the range of 0 to 8, inclusive. dci_max_pic_width indicates the maximum width, in units of luma samples, of a decoded picture when decoding the bitstream. dci_max_pic_height indicates the maximum height, in units of luma samples, of a decoded picture when decoding the bitstream. dci_max_chroma_format indicates the maximum value of sps_chroma_format_idc of the SPS referenced by a picture when decoding the bitstream. dci_ext_reserved_zero_6 bits shall be equal to 0 in bitstreams conforming to this version of this Specification. The values greater than 0 for dci_ext_reserved_zero_6 bits are reserved for future use by ITU-T|ISO/IEC. Decoders shall allow values greater than 0 for dci_ext_reserved_zero_6 bits to appear in the bitstream and shall ignore the value of dci_ext_reserved_zero_6 bits.

Below are some example embodiments for some of the aspects summarized above, some of which can be applied to VSEI. The relevant parts that have been added or modified are denoted in underline bold and the deleted parts are denoted in bold italics.

In an example, the SEI messages general category is modified as follows:

Clause 8 specifies the syntax and semantics for SEI messages. For SEI messages for which the specified syntax structure is empty, such as the dependent random access point SEI message, the mere indication that the SEI message is present (e.g., as indicated by a payload type indicator) is sufficient to convey the associated information (e.g., by indicating that a set of specified constraints are fulfilled). The semantics and persistence scope for each SEI message are specified in the semantics specification for each particular SEI message. NOTE—Persistence information for SEI messages is summarized below.

| Persistence scope of SEI messages (informative) | |
|---|---|
| SEI message | Persistence scope |
| Filler payload | The PU containing the SEI message |
| User data registered by Rec. ITU-T T.35 | Unspecified |
| User data unregistered | Unspecified |
| Film grain characteristics | Specified by the syntax of the SEI message |
| Frame packing arrangement | Specified by the syntax of the SEI message |
| Referenced parameter sets | The CLVS containing the SEI message |
| Decoded picture hash | The PU containing the SEI message |
| Mastering display colour volume | The CLVS containing the SEI message |
| Content light level information | The CLVS containing the SEI message |
| DRAP indication | The PU containing the SEI message |
| Alternative transfer characteristics | The CLVS containing the SEI message |
| Ambient viewing environment | The CLVS containing the SEI message |
| Content colour volume | Specified by the syntax of the SEI message |
| Equirectangular projection | Specified by the syntax of the SEI message |
| Generalized cubemap projection | Specified by the syntax of the SEI message |
| Sphere rotation | Specified by the syntax of the SEI message |
| Region-wise packing | Specified by the syntax of the SEI message |
| Omnidirectional viewport | Specified by the syntax of the SEI message |
| Frame-field information | The PU containing the SEI message |
| Sample aspect ratio information | Specified by the syntax of the SEI message |
| Decoder initialization information | The bitstream containing the access unit that the SEI message is associated with |

In an example, the decoder initialization information SEI message syntax is added/modified as follows:

| | Descriptor |
|---|---|
| decoding_init_info( payloadSize ) { | |
|   dii_max_level_idc | u(8) |
|   dii_max_tier_flag | u(1) |
|   dii_reserved_zero_bit | u(1) |
|   dii_max_chroma_format | u(2) |
|   dii_max_bitdepth_minus8 | u(4) |
|   dii_max_num_dec_pics_in_dpb_minus1 | u(8) |

| | Descriptor |
|---|---|
|   dii_max_pic_width | u(16) |
|   dii_max_pic_height | u(16) |
| } | |

In an example, the decoder initialization information SEI message semantics is added/modified as follows:

When associated with an AU, the decoder initialization information (DII) SEI message provides information that applies to the entire bitstream. A DTI SEI message could be made available to the decoder, through either being present in the bitstream, included in at least the first AU of the bitstream, or provided through external means. When present, all DTI SEI messages in a bitstream shall have the same payload content. When any two CVSs in the bitstream are indicated to conform to different profiles, there shall be no DTI SEI message associated with an AU of the bitstream. NOTE—When the DTI SEI message associated with an AU of a bitstream and the decoder is initialized according to the profile and the information provided in the DTI SEI message, it is expected that no decoder reinitialization is needed for decoding the entire bitstream. dii_max_level_idc indicates the maximum level to which a CVS in the bitstream conforms. dii_max_tier_flag, when the DII SEI message is used with an HEVC or VVC bitstream, indicates the maximum tier to which a CVS in the bitstream conforms. When the DII SEI message is used with an AVC bitstream, the semantics of dii_max_tier_flag is unspecified and the decoder shall ignore the value of dii_max_tier_flag. dii_reserved_zero_bit shall be equal to 0 in bitstreams conforming to this version of this Specification. The value equal to 1 for dii_reserved_zero_bit is reserved for future use by ITU-T|ISO/IEC. Decoders shall allow dii_reserved_zero_bit equal to 1 to appear in the bitstream and shall ignore the value of dii_reserved_zero_bit. dii_max_chroma_format indicates the maximum value of sps_chroma_format_idc (when the DII SEI message is used with a VVC bitstream) or chroma_format_idc (when the DII SEI message is used with an AVC or HEVC bitstream) of the SPS referenced by a picture when decoding the bitstream. dii_max_bitdepth_minus8 plus 8 indicates the maximum bit depth, in units of bits, of each colour component of a decoded picture when decoding the bitstream. The value of dii_max_bitdepth_minus8 shall be in the range of 0 to 8, inclusive.

dci_max_num_dec_pics_in_dpb_minus1 plus 1 indicates the maximum number of decoded pictures stored in the DPB at any moment when decoding the bitstream. When the DII SEI message is used with a VVC bitstream, the value of dci_max_num_dec_pics_in_dpb_minus1 shall be in the range of 0 to 15, inclusive. Note that this field is made 8 bits instead of 4 bits as in the DCI syntax above, such that the same syntax can be applicable to other (future) codec or profile that might have more than 16 decoded pictures stored in the DPB. For example, a layered HEVC bitstream might have altogether more than 16 decoded pictures stored in the DPB. dci_max_pic_width indicates the maximum width, in units of luma samples, of a decoded picture when decoding the bitstream. dci_max_pic_height indicates the maximum height, in units of luma samples, of a decoded picture when decoding the bitstream.

Below are some example embodiments for some of the aspects summarized above, some of which can be applied to ISOBMFF, by adding the following subclauses:

A video decoder initialization information track group is described as follows. An example definition of the video decoder initialization information track group is as follows. A TrackGroupTypeBox with track_group_type equal to 'vdii' indicates that this track belongs to a group of video tracks that use the same profile of the same video codec and share the same video decoder initialization information. When the video decoder is initialized according to the video decoder initialization information, it is expected that no video decoder reinitialization is needed when bitstream switching occurs between any two of the bitstreams carried in this group of tracks. The video codec used for a chunk of a video track is indicated by the sample entry type.

A syntax of the video decoder initialization information track group is described as follows:

```
aligned(8) class VdiiGroupBox extends TrackGroupTypeBox('vdii')
{
  unsigned int(8) dii_profile_max_tier_idc;
  unsigned int(8) dii_max_level_idc;
```

```
  unsigned int(2) dii_max_chroma_format_idc;
  unsigned int(4) dii_max_bitdepth_minus8;
  bit(2) reserved;
  unsigned int(8) dii_max_num_dec_pics_in_dpb_minus1;
  unsigned int(16) dii_max_pic_width;
  unsigned int(16) dii_max_pic_height;
}
```

A semantics of the video decoder initialization information track group is described as follows: dii_profile_max_tier_idc indicates the profile and, when applicable (e.g., HEVC and VVC), the maximum tier to which the video bitstreams carried in the group of tracks conform. When the video codec is AVC, dii_profile_max_tier_idc shall be equal to the profile_idc. When the video codec is HEVC or VVC, the first 7 bits of dii_profile_max_tier_idc shall be equal to general_profile_idc, and the last bit of dii_profile_max_tier_idc shall be equal to the greatest value of general_tier_flag for all the video bitstreams carried in the group of tracks. dii_max_level_idc indicates the maximum level to which the video bitstreams carried in the group of tracks conform. dii_max_chroma_format_idc indicates the maximum value of sps_chroma_format_idc (when the video codec is VVC) or chroma_format_idc (when the video codec is AVC or HEVC) of the SPS referenced by a picture when decoding the bitstreams carried in the group of tracks. dii_max_bitdepth_minus8 plus 8 indicates the maximum bit depth, in units of bits, of each colour component of a decoded picture when decoding the bitstreams carried in the group of tracks. The value of dii_max_bitdepth_minus8 shall be in the range of 0 to 8, inclusive. dci_max_num_dec_pics_in_dpb_minus1 plus 1 indicates the maximum number of decoded pictures stored in the decoded picture buffer at any moment when decoding the bitstreams carried in the group of tracks. dci_max_pic_width indicates the maximum width, in units of luma samples, of a decoded picture when decoding the bitstreams carried in the group of tracks. dci_max_pic_height indicates the maximum height, in units of luma samples, of a decoded picture when decoding the bitstreams carried in the group of tracks.

Below are some example embodiments for some of the aspects summarized above, some of which can be applied to DASH. The relevant parts that have been added or modified are denoted in underline bold and the deleted parts are denoted in bold italics.

| Semantics of Adaptation Set element | | |
|---|---|---|
| Element or Attribute Name | Use | Description |
| AdaptationSet | | Adaptation Set description. |
| @xlink:href | O | specifies a reference to a remote element entity that shall contain exactly one element of type AdaptationSet. |
| @xlink:actuate | OD default: 'onRequest' | specifies the processing instructions, which can be either "onLoad" or "onRequest". |
| @id | O | specifies a unique identifier for this Adaptation Set in the scope of the Period. The attribute shall be a unique unsigned integer value in the scope of the containing Period. The attribute shall not be present in a remote element entity. If not present, no identifier for the Adaptation Set is specified. |
| . . . | . . . | . . . |

| Semantics of Adaptation Set element | | |
|---|---|---|
| Element or Attribute Name | Use | Description |
| SegmentTemplate | 0 ... 1 | specifies default Segment Template information. Information in this element is overridden by information in the Representation.SegmentTemplate, if present. |
| VideoDecoderInitInfo | 0 ... 1 | specifies the video decoder initialization information for all Representations in this Adaptation Set. For more details, see subclause below. |
| Representation | 0 ... N | specifies a Representation. At least one Representation element shall be present in each Adaptation Set. The actual element may however be part of a remote element entity if xlink is used on the containing AdaptationSet element. |

Key
For attributes: M = mandatory, O = optional, OD = optional with default value, CM = conditionally mandatory, F = fixed
For elements: <minOccurs> ... <maxOccurs> (N = unbounded)
The conditions only hold without using xlink:href. If linking is used, then all attributes are "optional" and <minOccurs = 0>.

An example Extensible Markup Language (XML) syntax is as follows.

```
<!-- Adaptation Set -->
<xs:complexType name="AdaptationSetType">
    <xs:complexContent>
        <xs:extension base="RepresentationBaseType">
            <xs: sequence>
                <xs:element name="Accessibility" type="DescriptorType" minOccurs="0" maxOccurs="unbounded"/>
                <xs:element name="Role" type="DescriptorType" minOccurs="0" maxOccurs="unbounded"/>
                <xs:element name="Rating" type="DescriptorType" minOccurs="0" maxOccurs="unbounded"/>
                <xs:element name="Viewpoint" type="DescriptorType" minOccurs="0" maxOccurs="unbounded"/>
                <xs:element name="ContentComponent" type="ContentComponentType" minOccurs="0" maxOccurs="unbounded"/>
                <xs:element name="BaseURL" type="BaseURLType" minOccurs="0" maxOccurs="unbounded"/>
                <xs:element name="SegmentBase" type="SegmentBaseType" minOccurs="0"/>
                <xs:element name="SegmentList" type="SegmentListType" minOccurs="0"/>
                <xs:element name="SegmentTemplate" type="SegmentTemplateType" minOccurs="0"/>
```

-continued

```
                <xs:element name=" VideoDecoderInitInfo" type=" VideoDecoderInitInfoType" minOccurs="0"/>
                <xs:element name="Representation" type="RepresentationType" minOccurs="0" maxOccurs="unbounded"/>
```

An example of definition of Video Decoder Initialization Information is as follows. The element VideoDecoderInitInfo may be present in an Adaptation Set to provide the video decoder initialization information for video bitstreams carried in all the Representations in the Adaptation Set. The presence of this element indicates that all Representations of the Adaptation Set use the same profile of the same video codec and share the same decoder initialization information. When the video decoder is initialized according to the video decoder initialization information, when present, it is expected that no video decoder reinitialization is needed when bitstream switching occurs between any two of the bitstreams carried in all the Representations in this Adaptation Set. The video codec and profile bitstreams carried in the Representations in the Adaptation Set are signalled by the @codecs attribute.

An example of semantics of Video Decoder Initialization Information is as follows.

| Semantics of VideoDecoderInitInfo element | | |
|---|---|---|
| Element or Attribute Name | Use | Description |
| VideoDecoderInitInfo | | Decoder Initialization Information description |
| @maxTier | O | specifies the maximum tier for all the video bitstreams carried in the Representations in the Adaptation Set. When the codec is AVC or another video codec that does not have tier specified, this attribute shall not be present. When the codec is HEVC or VVC or another video codec that has tier specified, this attribute shall be present. |
| @maxLevel | M | specifies the maximum level for all the video bitstreams carried in the Representations in the Adaptation Set. |
| @maxChromaFormat | M | specifies the maximum value of sps_chroma_format_idc (when the video codec is VVC) or chroma_format_idc (when the video codec is AVC or HEVC) of the SPS referenced by a picture when decoding the |

Semantics of VideoDecoderInitInfo element

| Element or Attribute Name | Use | Description |
|---|---|---|
| | | video bitstreams carried in the Representations in the Adaptation Set. |
| @maxBitDepthMinus8 | M | specifies the maximum bit depth, in units of bits, of each colour component of a decoded picture when decoding the bitstreams carried in the in the Representations in the Adaptation Set. The value shall be in the range of 0 to 8, inclusive. |
| @maxNumDecPicsMinus1 | M | the value plus 1 specifies the maximum number of decoded pictures stored in the decoded picture buffer at any moment when decoding the bitstreams carried in the Representations in the Adaptation Set. |
| @maxDecPicWidth | M | specifies the maximum width, in units of luma samples, of a decoded picture when decoding the bitstreams carried in the Representations in the Adaptation Set. |
| @maxDecPicHeight | M | specifies the maximum height, in units of luma samples, of a decoded picture when decoding the bitstreams carried in the Representations in the Adaptation Set. |

Legend:
For attributes: M = mandatory, O = optional

An example XML syntax is as follows.

```
<!-- VideoDecoderInitInfo -->
<xs:complexType name="VideoDecoderInitInfoType">
  <xs:attribute name=" maxTier" type="xs:unsignedInt"/>
  <xs:attribute name=" maxLevel" type="xs:unsignedInt" use="required"/>
  <xs:attribute name=" maxChromaFormat" type="xs:unsignedInt" use="required"/>
  <xs:attribute name=" maxBitDepthMinus8" type="xs:unsignedInt" use="required"/>
  <xs:attribute name=" maxNumDecPicsMinus1" type="xs:unsignedInt" use="required"/>
  <xs:attribute name=" maxDecPicWidth" type="xs:unsignedInt" use="required"/>
  <xs:attribute name=" maxDecPicHeight" type="xs:unsignedInt" use="required"/>
</xs:complexType>
```

FIG. 1 is a protocol diagram of an example mechanism 100 for establishing a communication session with SDP. For example, the communication session can be established for communicating video data between an encoder and/or a content server and a decoder. For example, the communication session can be established for streaming video from a sender to a receiver for display to a user (e.g., television). In another example, the sender and the receiver may be peers that communicate video in a bidirectional direction (e.g., a video call). As a specific example, the sender may send a stream of live video data to the receiver and the receiver may return a stream of live video data to the sender.

In SDP, the device that initiates the communication is referred to as the offerer (e.g., the decoder) and the responsive device is referred to as the answerer (e.g., the encoder). The offerer can initiate a video communication session by transmitting a SDP offer to the answerer at step 102. The SDP offer is a message that describes the media capabilities of the offerer, and hence describes the media that the offerer is willing to receive. The answerer reviews the SDP offer and determines whether the answerer can meet the conditions in the SDP offer. The answerer may accept or reject the SDP offer of step 102. Assuming the answerer decides to accept the request, the answerer can indicate such acceptance by transmitting a SDP answer to the offerer at step 104. The SDP answer describes the media that the answerer is willing to send based on the SDP offer. For example, the SDP answer can include the same description of the media as the SDP offer when the answerer agrees to the offerers terms. In another example, the SDP answer can include a subset of the media capabilities described in the SDP offer when the answerer agrees to some but not all of the offerers terms. Assuming some agreement is reached, the answerer can then transmit media to the offerer at step 106 based on the description in the SDP answer at step 104. In a bidirectional context, the mechanism 100 can be performed twice with each device acting as an offerer for a media stream to be received.

As noted above, the present disclosure signals decoder initialization information to the decoder, which may be an offerer in mechanism 100. This allows the decoder to perform an initialization process based on parameters for multiple potential media streams in order to minimize the need to reinitialize the decoder when swapping between streams. In an example, the decoder initialization information can be signaled/requested by the offerer in the SDP offer at step 102. The encoder can then respond by signaling the decoder initialization information in the SDP answer at step 104. The decoder can then perform an initialization based on the decoder initialization information received in the SDP answer at step 104. In a specific example, the decoder initialization information can be requested and/or transmitted in the SDP offer and/or in the SDP answer in a RTP header extension.

Figure 2:
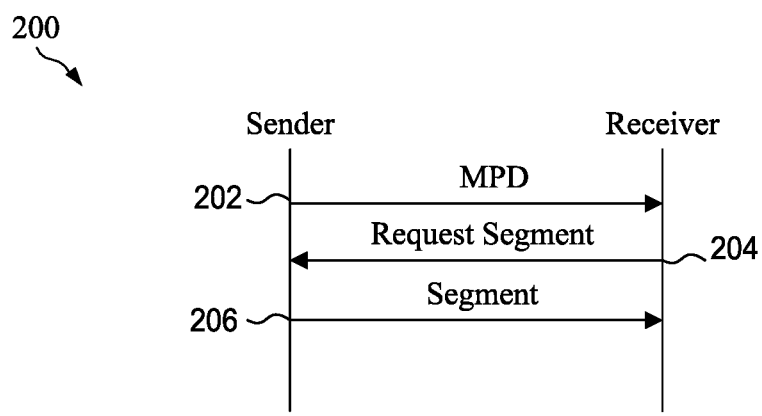
FIG. 2 is a protocol diagram of an example mechanism for performing video streaming according to DASH.

FIG. 2 is a protocol diagram of an example mechanism 200 for performing video streaming according to DASH. DASH allows a receiver (e.g., offerer/decoder) to select from multiple alternative media streams during a single media session. In this way, the receiver can dynamically increase or decrease the video resolution based on changing network conditions. Accordingly, the receiver consistently receives the best video resolution available based on current network conditions while avoiding pausing the video stream to await more data when network conditions worsen. DASH may be used in conjunction with SDP. For example, mechanism 200 may be used to transport media according to step 106 of mechanism 100.

The functionality described above is accomplished by transmitting a MPD from the sender to the receiver at step 202. The MPD describes a plurality of alternate and interchangeable media streams. For example, each media stream may describe the same media at a different resolution, compression, etc. At step 204, the receiver uses the description in the MPD to request a segment of the media. For example, the receiver can review the current network conditions and/or the current buffer condition. When the buffer is filling with new media data faster than the older media data can be displayed, then the receiver can request a segment from a higher resolution media stream. When the buffer is emptying due to the display of media data occurring faster than new media data can be received, then the receiver can request a segment from a lower resolution media stream. At step 206, the sender (e.g., answerer, encoder and/or content server) can send the segment requested at step 204. Steps 204 and 206 are repeated until the media presentation is completed (or a user cancels the session).

As noted above, the present disclosure signals decoder initialization information to the decoder, which may be the receiver in mechanism 200. This allows the decoder to perform an initialization process based on parameters for multiple potential media streams in order to minimize the need to reinitialize the decoder when swapping between streams. In an example, the decoder initialization information can be signaled in the MPD signaled at step 202. For example, the decoder initialization information can describe each of the media streams that the receiver can request. The decoder can then perform an initialization based on the decoder initialization information in the MPD.

Figure 3:
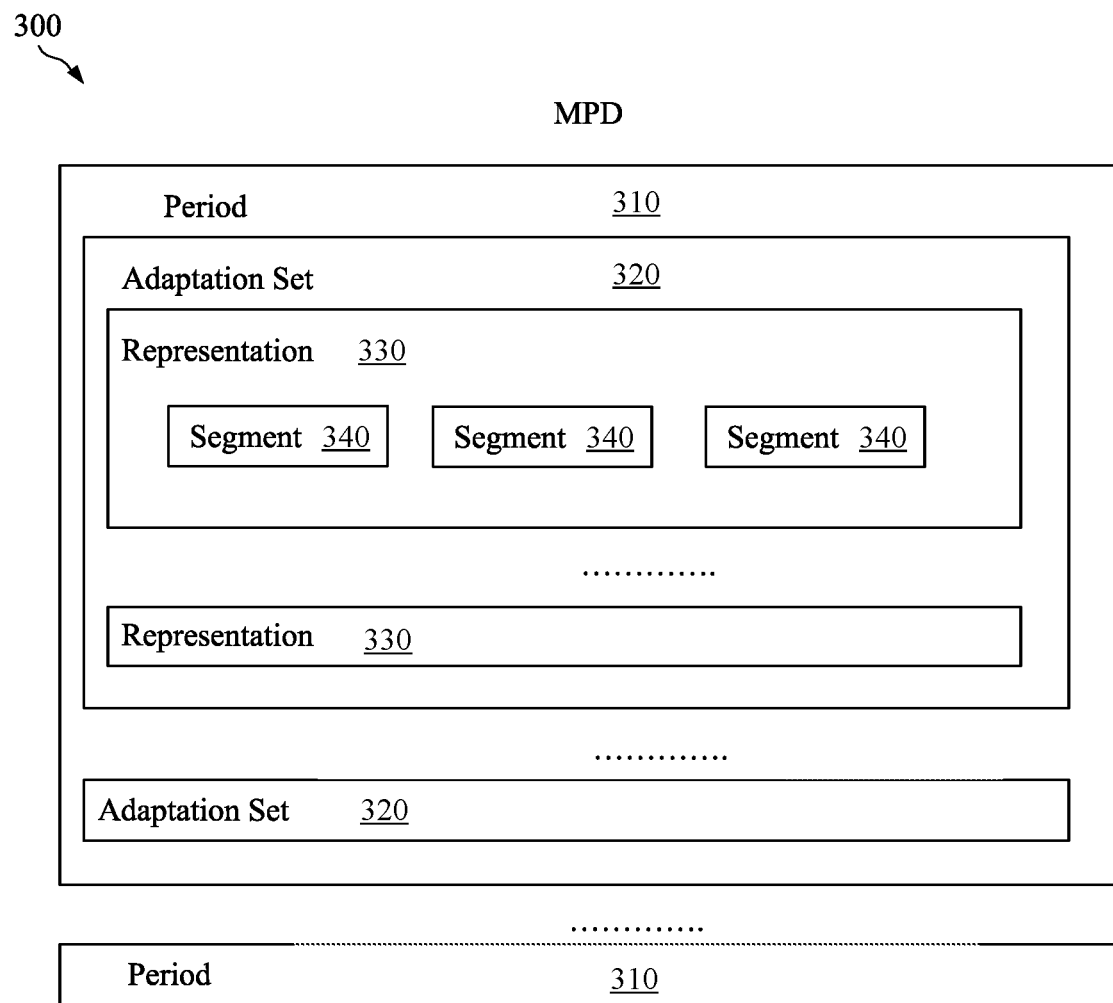
FIG. 3 is a schematic diagram illustrating a description of a video by a MPD used in DASH.

FIG. 3 is a schematic diagram illustrating a description of a video by a MPD 300 used in DASH, for example in step 202 of mechanism 200. The MPD 300 describes the media streams in terms of periods 310, adaptation sets 320, representations 330, and segments 340. A period 310 comprises timing data and indicates a content period during which a consistent set of encoded versions of the media content is available (e.g., a set of available bitrates, languages, captions, subtitles etc. that do not change). A period 310 can contain one or more adaptation sets 320. An adaptation set 320 includes a set of interchangeable encoded versions of one or several media content components. For example, a first adaptation set 320 may comprise a main video component, a second adaptation set 320 may comprise a main audio component, a third adaptation set 320 may comprise captions, etc. An adaption set 320 may also comprise multiplexed content, such as combined video and audio. Each adaptation set 320 comprises one or more representations 330. A representation 330 describes a deliverable encoded version of one or more media content components, such as an ISOBMFF version of the media content. The media content in a representation 330 is further divided into segments 340. A segment 340 is a pre-defined byte size (e.g., 1,000 bytes) and/or an interval of playback time (e.g., 2 or 5 seconds) of the media content. Each segment 340 is an individually addressable unit of data that can be downloaded using universal resource locators (URLs) advertised via the MPD 300.

For example, for each period 310 the decoder can select one or more adaptation sets 320 to obtain video, audio, and/or close captioning based on the data in the MPD 300. The decoder can then begin streaming media data from the selected adaptation sets 320. The decoder can select a representation 330 for each adaptation set 320 based on the current network conditions and use URLs to obtain corresponding segments 340 for presentation to the user. As network conditions change, the decoder can select different representations 330 within the corresponding adaptation sets 320. This allows the decoder to get segments 340 of the corresponding media at the best quality that can be presented without pausing to refill the buffer based on current network conditions.

In an example, the decoder initialization information can be included in the MPD 300 in data describing an adaptation set 320 and/or in data describing a representation 330. For example, an adaptation set 320 can include the decoder initialization information for each representation 330 contained in the adaptation set 320. In another example, each representation 330 can contain decoder initialization information describing that representation's 330 media. The decoder can then use the decoder initialization information to perform an initialization process. In this way, the decoder is initialized for any representation 330 the decoder may select. As such, the decoder should not need to reinitialized due to swapping between representations 330 within a selected adaptation set 320.

Figure 4:
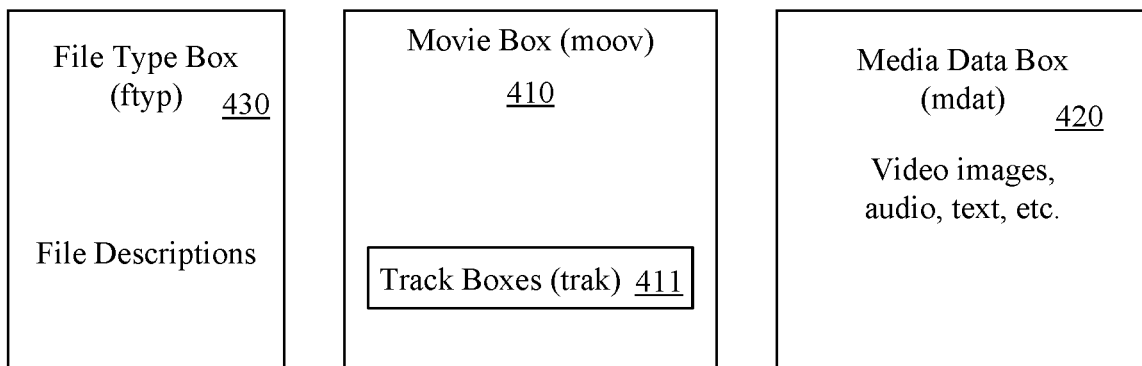
FIG. 4 is a schematic diagram of a media file stored in ISOBMFF.

FIG. 4 is a schematic diagram of a media file 400 stored in ISOBMFF. For example, a media file 400 can be stored in ISOBMFF and used as a DASH representation. An ISOBMFF media file 400 is stored in a plurality of boxes that carry objects and/or data associated with a media content or a media presentation. For example, media file 400 may comprise a file type box (e.g., ftyp) 430, a movie box (e.g., moov) 410, and a media data box (e.g., mdat) 420.

A file type box 430 may carry data that describes the entire file, and hence may carry file level data. Accordingly, a file-level box is any box that contains data relevant to the entire media file 400. For example, the file type box 430 may comprise a file type that indicates a version number of an ISO specification and/or compatibility information of the media file 400. A movie box 410 may carry data that describes a movie contained in the media file, and hence may carry movie-level data. A move-level box is any box that contains data that describes an entire movie contained in the media file 400. A movie box 410 can contain a wide range of sub-boxes that are used to contain data for various uses. For example, the movie box 410 contains track boxes (trak) 411 that carry metadata describing a track of a media presentation. For example, one of the track boxes 411 may carry an audio description of audio data in the media data box 420, another track box 411 may carry a video description of a video data in the media data box 420, and yet another track box 411 may carry hints for streaming and/or playback of the media data in the media data box 420. It should be noted that a track may be referred to as a timed sequence of related samples. For example, a media track may comprise a sequence of images or sampled audio, whereas a metadata track may comprise a sequence of metadata in the units of the metadata. Data that describes a track is track-level data, and hence any box that describes a track is a track-level box.

A media data box 420 comprises interleaved and time-ordered media data (e.g., coded video images and/or audio in one more media tracks) of the media presentation. For example, the media data box 420 may comprise a bitstream of video data coded according to VVC, AVC, HEVC, etc. A media data box 420 may include video images, audio, text, or other media data for display to the user.

As noted above, the present disclosure signals decoder initialization information to the decoder. This allows the decoder to perform an initialization process based on parameters for multiple potential media streams in order to minimize the need to reinitialize the decoder when swapping between streams. In an example, the decoder initialization information can be signaled in the media file 400. For example, the decoder initialization information can be signaled in a file-level box, a movie-level box, and/or a track-level box, such as file type box 430, movie box 410, and/or track boxes 411. As discussed above, ISOBMFF includes many different boxes for particular purposes. In various examples, the decoder initialization information can be signaled in a file-level metadata box (contained in file type box 430), a movie-level metadata box (contained in movie box 410), a movie header box (mvhd) (contained in movie box 410), a sample description box (stsd) (contained in track box 411), a track header box (contained in track box 411), a track group box (contained in track box 411), a track-level metadata box (contained in track box 411), other boxes, and/or various combinations thereof.

Figure 5:
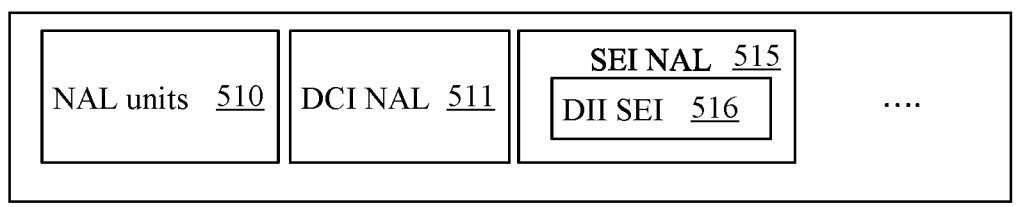
FIG. 5 is a schematic diagram of a bitstream containing encoded visual media data.

FIG. 5 is a schematic diagram of a bitstream 500 containing encoded visual media data. A bitstream 500 contains media data that has been coded/compressed by an encoder for decoding/decompression by a decoder. For example, a bitstream 500 may be included in a media data box 420 of an ISOBMFF media file 400. Further, a bitstream 500 may be included in a representation 330 in DASH. A bitstream 500 can be coded according to various coding formats, such as VVC, AVC, EVC, HEVC, etc. In some coding formats, the bitstream 500 is expressed as a series of NAL units 510. A NAL unit 510 is a unit of data sized to be positioned in a data packet. For example, VVC contains many types of NAL units 510. A bitstream 500 can contain video coding layer (VCL) NAL units that contain video data and non-VCL NAL units that contain data describing the VCL NAL units, describing the coding tools employed, describing the coding constraints, etc. In an example, a bitstream 500 can include a DCI NAL unit 511 and/or SEI NAL units 515. A DCI NAL unit 511 is a non-VCL NAL unit that contains data describing the coding capabilities needed by the decoder to decode the corresponding bitstream. A SEI NAL unit 515 contains data that assists processes related to decoding, display, or other purposes, but is not needed by the decoding process to determine sample values in decoded pictures. In an example, the decoder initialization information can be contained in a DCI NAL unit 511 and/or a SEI NAL unit 515. As a specific example, a SEI NAL unit 515 can contain a DII SEI message 516, which is a SEI message specifically designed to carry the decoder initialization information for the bitstream 500. As a specific example, the bitstream 500 may be further divided into AUs and a DTI SEI message 516 may be included in the first AU in the bitstream 500. Accordingly, the decoder may fetch the first AU of each bitstream 500 that the decoder may decode and display as part of a media presentation. The decoder can then perform an initialization based on the decoder initialization information in each of the relevant bitstreams 500 in order to avoid reinitialization.

Figure 6:
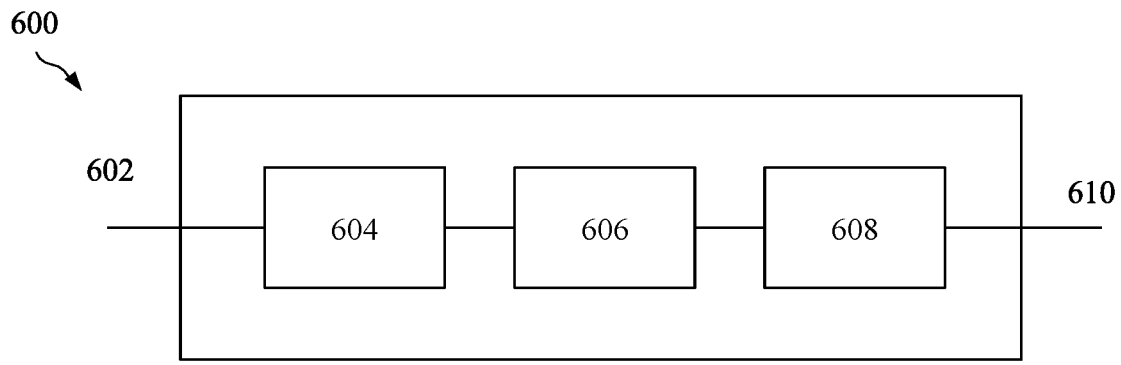
FIG. 6 is a block diagram showing an example video processing system.

FIG. 6 is a block diagram showing an example video processing system 600 in which various techniques disclosed herein may be implemented. Various implementations may include some or all of the components of the system 600. The system 600 may include input 602 for receiving video content. The video content may be received in a raw or uncompressed format, e.g., 8 or 10 bit multi-component pixel values, or may be in a compressed or encoded format. The input 602 may represent a network interface, a peripheral bus interface, or a storage interface. Examples of network interface include wired interfaces such as Ethernet, passive optical network (PON), etc. and wireless interfaces such as Wi-Fi or cellular interfaces.

The system 600 may include a coding component 604 that may implement the various coding or encoding methods described in the present disclosure. The coding component 604 may reduce the average bitrate of video from the input 602 to the output of the coding component 604 to produce a coded representation of the video. The coding techniques are therefore sometimes called video compression or video transcoding techniques. The output of the coding component 604 may be either stored, or transmitted via a communication connected, as represented by the component 606. The stored or communicated bitstream (or coded) representation of the video received at the input 602 may be used by a component 608 for generating pixel values or displayable video that is sent to a display interface 610. The process of generating user-viewable video from the bitstream representation is sometimes called video decompression. Furthermore, while certain video processing operations are referred to as "coding" operations or tools, it will be appreciated that the coding tools or operations are used at an encoder and corresponding decoding tools or operations that reverse the results of the coding will be performed by a decoder.

Examples of a peripheral bus interface or a display interface may include universal serial bus (USB) or high definition multimedia interface (HDMI) or Displayport, and so on. Examples of storage interfaces include SATA (serial advanced technology attachment), PCI, IDE interface, and the like. The techniques described in the present disclosure may be embodied in various electronic devices such as mobile phones, laptops, smartphones or other devices that are capable of performing digital data processing and/or video display.

Figure 7:
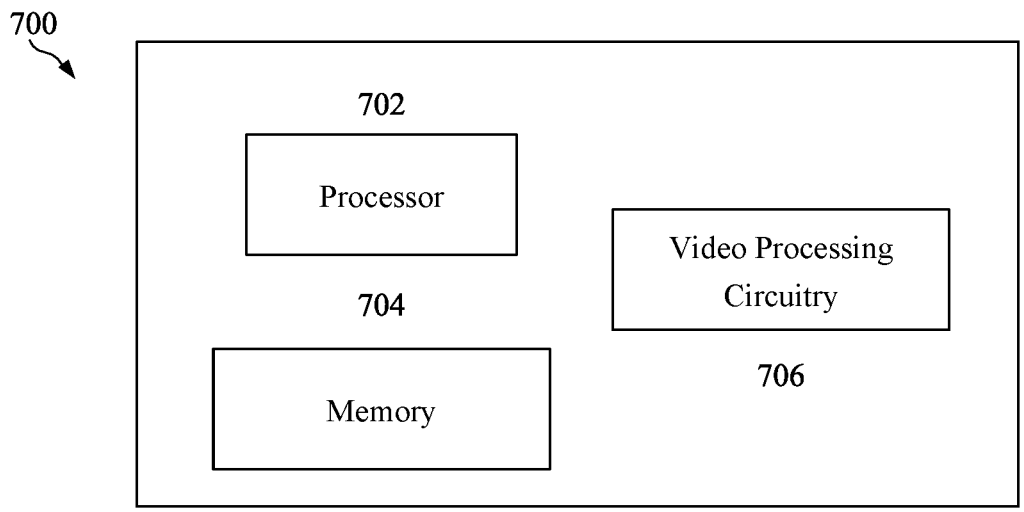
FIG. 7 is a block diagram of an example video processing apparatus.

FIG. 7 is a block diagram of an example video processing apparatus 700. The apparatus 700 may be used to implement one or more of the methods described herein. The apparatus 700 may be embodied in a smartphone, tablet, computer, Internet of Things (IoT) receiver, and so on. The apparatus 700 may include one or more processors 702, one or more memories 704 and video processing hardware 706. The processor(s) 702 may be configured to implement one or more methods described in the present disclosure. The memory (memories) 704 may be used for storing data and code used for implementing the methods and techniques described herein. The video processing hardware 706 may be used to implement, in hardware circuitry, some techniques described in the present disclosure. In some embodiments, the video processing hardware 706 may be at least partly included in the processor 702, e.g., a graphics co-processor.

Figure 8:
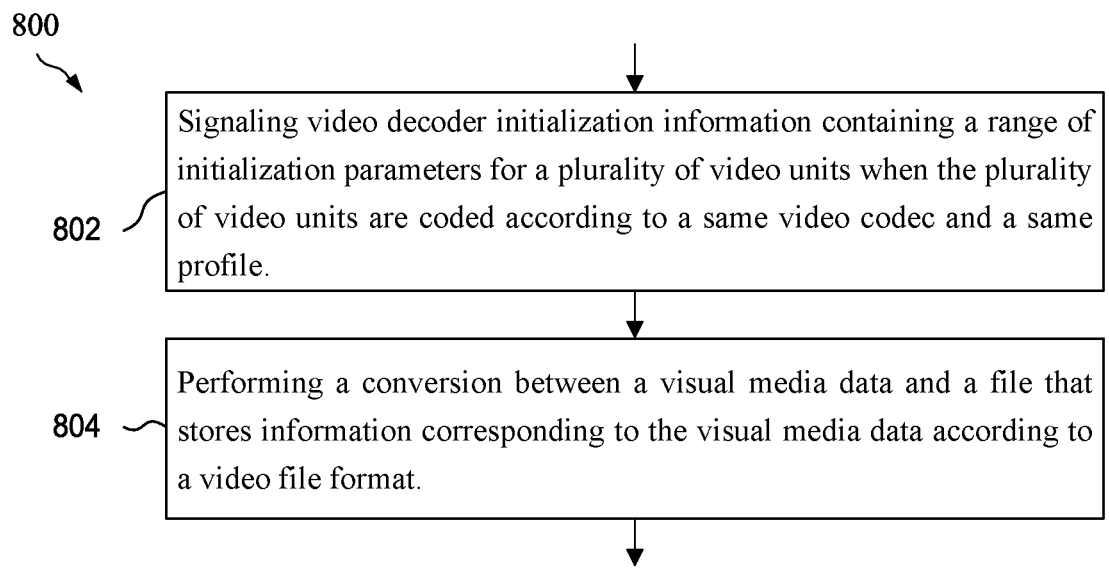
FIG. 8 is a flowchart for an example method of video processing.

FIG. 8 is a flowchart for an example method 800 of video processing. The method 800 includes signaling video decoder initialization information containing a range of initialization parameters at step 802. The initialization parameters are for use with a plurality of video units when the plurality of video units are coded according to a same video codec and a same profile. In the context of an encoder, the signaling includes obtaining video decoder initialization information and encoding such parameters for transmission to a decoder. In the context of a decoder, the signaling includes receiving the video decoder initialization information and initializing the decoder in preparation for decoding a visual media data file. At step 804, a conversion is performed between a visual media data and a file that stores information corresponding to the visual media data according to a video file format. In the context of an encoder, this conversion can be performed by receiving the visual media data, encoding the visual media data into a visual media data file in the video file format based on the video decoder initialization information, and storing the video media data file for transmission toward a decoder. In the context of a decoder, this conversion can be performed by decoding a visual media data file in the video file format to obtain visual media data for display using settings selected based on the video decoder initialization information.

As noted above, the video decoder initialization information can be signaled by various mechanisms, depending on the example. For example, the decoder initialization information can be signaled in at least one DCI NAL unit in at least one bitstream. In another example, the decoder initialization information can be signaled in at least one DII SEI message in at least one bitstream. In a specific example, the DII SEI message can be required to be present in a first AU of a corresponding bitstream. In another example, the decoder initialization information can be signaled in an ISOBMFF file in a file-level box, a movie-level box, at least one track-level box, or combinations thereof. For example, the decoder initialization information can be signaled in a file-level metadata box, a movie-level metadata box, a movie header box, a sample description box, a track header box, a track group box, a track-level metadata box, or combinations thereof. In another example, the decoder initialization information can be signaled in a DASH MPD. For example, the decoder initialization information can be signaled in an adaptation set, a representation, or combinations thereof. In another example, the decoder initialization information can be signaled in a RTP header extension. For example, the decoder initialization information can be signaled as part of a SDP offer, an SDP answer, or combinations thereof.

In an example, the plurality of video units include bitstreams containing coded video sequences. Further, the video decoder initialization information may only be signaled when the coded video sequences are coded according to the same video codec and when the coded video sequences conform to the same profile. In an example, the plurality of video units include video tracks. The decoder initialization information can be signaled in a file level box or a movie level box of an ISOBMFF file. Further, the video decoder initialization information can apply to one or more sets of alternative video tracks that use the same profile of the same video codec. In another example, the video decoder initialization information applies to all video tracks that use the same profile of the same video codec. In an example, the plurality of video units can include sample entries in a video track. Further, the decoder initialization information can be signaled in a track level box of an ISOBMFF file. The decoder initialization information can apply to the video track. In an example, all sample entries of the video track are required to indicate the same profile of the same video codec. In an example, the decoder initialization information is signaled in a track group box of an ISOBMFF file. A presence of the decoder initialization information can indicate that the video track is part of a group of video tracks that all use the same profile of the same video codec and share a same decoder initialization information. In an example, a presence of the decoder initialization information can indicate that all sample entries in all tracks in the group of video tracks use the same profile of the same video codec and share a same decoder initialization information. In an example, the decoder initialization information can indicate a current track and all tracks indicated as alternative tracks to the current track use the same profile of the same video codec and share a same decoder initialization information.

In an example, the plurality of video units may include representations in an adaptation set. The video decoder initialization information may only be signaled when the representations are coded according to the same video codec and when the representations conform to the same profile. On an example, the decoder initialization information is signaled in an adaptation set in a DASH MPD. The decoder initialization information can apply to all representations in the adaptation set that use the same profile of the same video codec. In an example, a presence of the decoder initialization information indicates that all representations of the adaptation set use the same profile of the same video codec.

The video decoder initialization information may include a range of initialization parameters. For example, the video decoder initialization information can include the same parameter that is set to different values for different bitstreams, tracks, and/or representations. Further, the video decoder initialization information can include multiple different parameters for the various bitstreams, tracks, and/or representations. The decoder can then use any or all of the range of initialization parameters to initialize the decoder with setting that minimize reinitialization when swapping between the indicated bitstreams, tracks, and/or representations. For example, the video decoder initialization information may include a maxDecPics stored in a DPB when decoding a bitstream, a maximum maxDecPicW of coded pictures in the bitstream, a maxDecPicH of coded pictures in the bitstream, or combinations thereof. Further, the video decoder initialization information may include an indication of usage of inter-layer prediction, reference picture resampling, wrap around motion compensation, motion vector prediction from reference pictures, palette coding mode, adaptive color transform, intra block copy, ALF APS NAL unit, LMCS APS NAL unit, scaling list APS NAL unit, or combinations thereof in a corresponding bitstream. Further, the video decoder initialization information may include an indication of a maximum picture order count between a current picture and a corresponding reference picture. Further, the video decoder initialization information may include an indication of maximum color format, maximum bit depth, maximum coded picture buffer size, minimum CU size, scaling ratio calculation information, or combinations thereof. Further, the video decoder initialization information may include an indication of usage of deblocking, padding, sub-picture partitioning, slice partitioning, tile partitioning, wrap-around motion compensation, reference picture resampling, long term reference pictures, or combinations thereof. Further, the video decoder initialization information may include a maximum tier to which all CVSs of a corresponding bitstream conform, a maximum level to which all CVSs of a corresponding bitstream conform, or combinations thereof. Further, the video decoder initialization information may include an indication of a video codec used to perform the conversion between the visual media data and the visual media data file. Further, the video decoder initialization information may include a profile to which all bitstreams conform.

It should be noted that the method 800 can be implemented in an apparatus for processing video data comprising a processor and a non-transitory memory with instructions thereon, such as video encoder 1000, video decoder 1100, and/or encoder 1200. In such a case, the instructions upon execution by the processor, cause the processor to perform the method 800. Further, the method 800 can be performed by a non-transitory computer readable medium comprising a computer program product for use by a video coding device. The computer program product comprises computer executable instructions stored on the non-transitory computer readable medium such that when executed by a processor cause the video coding device to perform the method 800.

Figure 9:
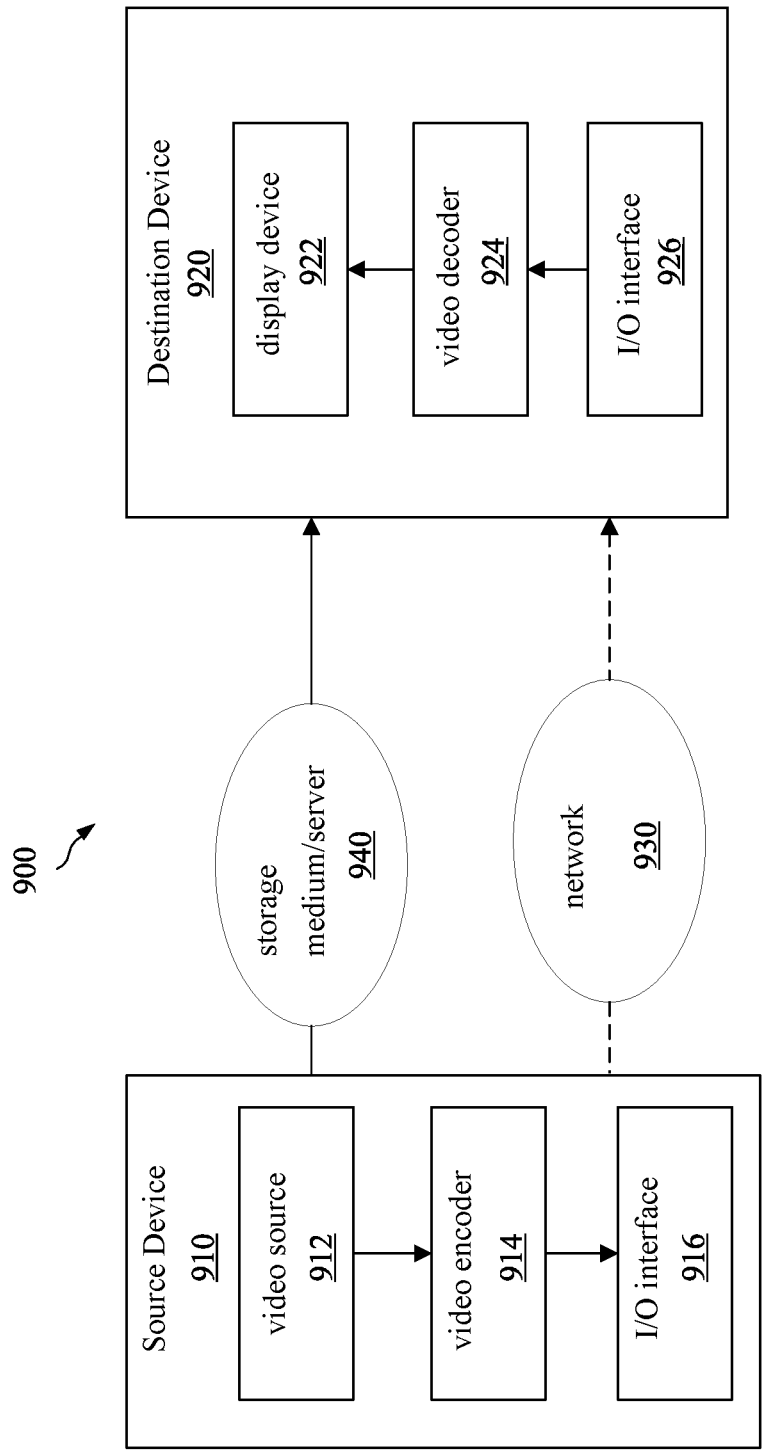
FIG. 9 is a block diagram that illustrates an example video coding system.

FIG. 9 is a block diagram that illustrates an example video coding system 900 that may utilize the techniques of this disclosure. As shown in FIG. 9, video coding system 900 may include a source device 910 and a destination device 920. Source device 910 generates encoded video data which may be referred to as a video encoding device. Destination device 920 may decode the encoded video data generated by source device 910 which may be referred to as a video decoding device.

Source device 910 may include a video source 912, a video encoder 914, and an input/output (I/O) interface 916. Video source 912 may include a source such as a video capture device, an interface to receive video data from a video content provider, and/or a computer graphics system for generating video data, or a combination of such sources. The video data may comprise one or more pictures. Video encoder 914 encodes the video data from video source 912 to generate a bitstream. The bitstream may include a sequence of bits that form a coded representation of the video data. The bitstream may include coded pictures and associated data. The coded picture is a coded representation of a picture. The associated data may include sequence parameter sets, picture parameter sets, and other syntax structures. I/O interface 916 may include a modulator/demodulator (modem) and/or a transmitter. The encoded video data may be transmitted directly to destination device 920 via I/O interface 916 through network 930. The encoded video data may also be stored onto a storage medium/server 940 for access by destination device 920.

Destination device 920 may include an I/O interface 926, a video decoder 924, and a display device 922. I/O interface 926 may include a receiver and/or a modem. I/O interface 926 may acquire encoded video data from the source device 910 or the storage medium/server 940. Video decoder 924 may decode the encoded video data. Display device 922 may display the decoded video data to a user. Display device 922 may be integrated with the destination device 920, or may be external to destination device 920, which can be configured to interface with an external display device.

Video encoder 914 and video decoder 924 may operate according to a video compression standard, such as the High Efficiency Video Coding (HEVC) standard, Versatile Video Coding (VVC) standard and other current and/or further standards.

Figure 10:
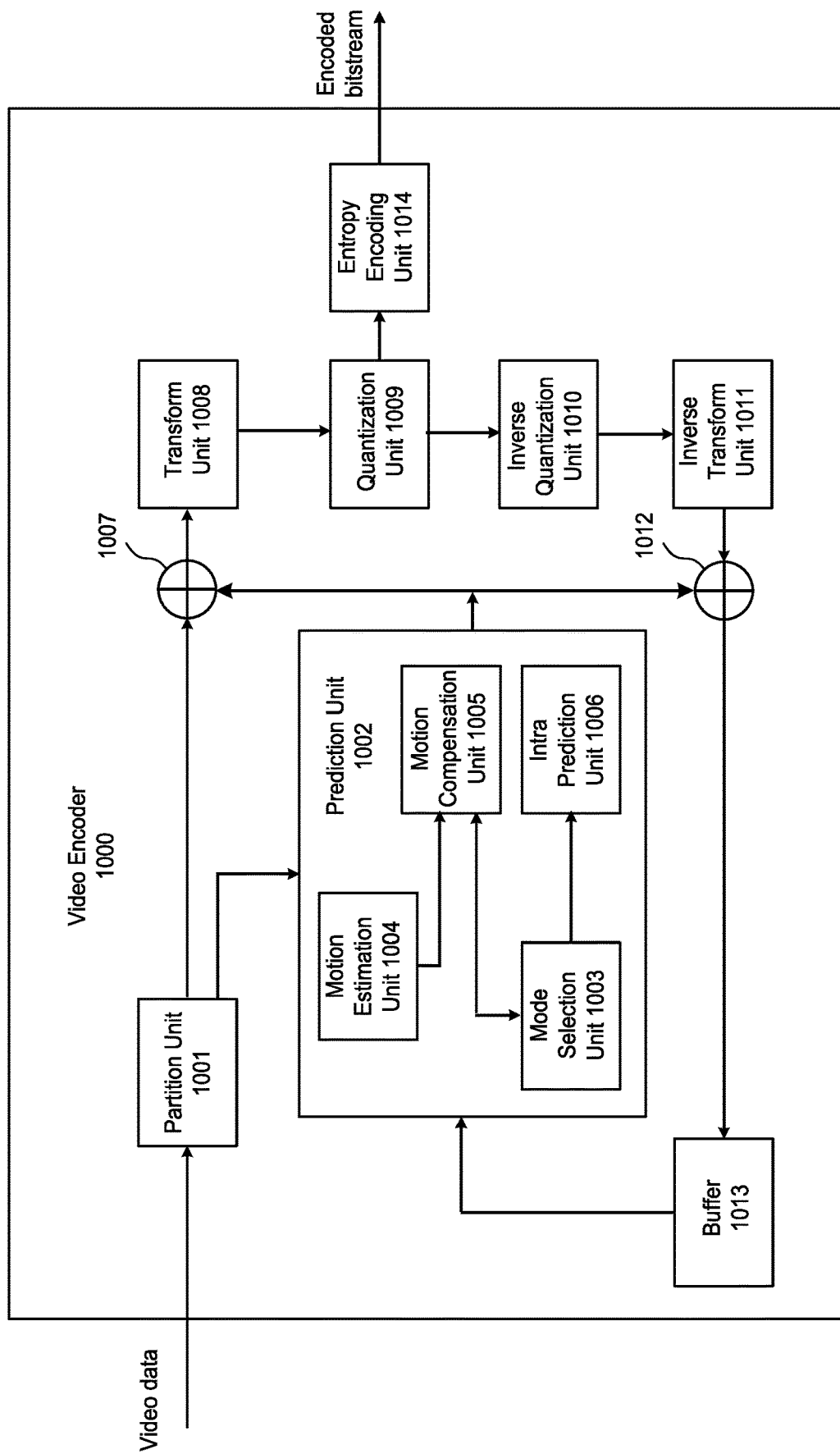
FIG. 10 is a block diagram that illustrates an example encoder.

FIG. 10 is a block diagram illustrating an example of video encoder 1000, which may be video encoder 914 in the system 900 illustrated in FIG. 9. Video encoder 1000 may be configured to perform any or all of the techniques of this disclosure. In the example of FIG. 10, video encoder 1000 includes a plurality of functional components. The techniques described in this disclosure may be shared among the various components of video encoder 1000. In some examples, a processor may be configured to perform any or all of the techniques described in this disclosure.

The functional components of video encoder 1000 may include a partition unit 1001, a prediction unit 1002 which may include a mode select unit 1003, a motion estimation unit 1004, a motion compensation unit 1005, an intra prediction unit 1006, a residual generation unit 1007, a transform processing unit 1008, a quantization unit 1009, an inverse quantization unit 1010, an inverse transform unit 1011, a reconstruction unit 1012, a buffer 1013, and an entropy encoding unit 1014.

In other examples, video encoder 1000 may include more, fewer, or different functional components. In an example, prediction unit 1002 may include an intra block copy (IBC) unit. The IBC unit may perform prediction in an IBC mode in which at least one reference picture is a picture where the current video block is located.

Furthermore, some components, such as motion estimation unit 1004 and motion compensation unit 1005 may be highly integrated, but are represented in the example of FIG. 10 separately for purposes of explanation.

Partition unit 1001 may partition a picture into one or more video blocks. Video encoder 1000 and video decoder 1100 may support various video block sizes.

Mode select unit 1003 may select one of the coding modes, intra or inter, e.g., based on error results, and provide the resulting intra- or inter-coded block to a residual generation unit 1007 to generate residual block data and to a reconstruction unit 1012 to reconstruct the encoded block for use as a reference picture. In some examples, mode select unit 1003 may select a combination of intra and inter prediction (CIIP) mode in which the prediction is based on an inter prediction signal and an intra prediction signal. Mode select unit 1003 may also select a resolution for a motion vector (e.g., a sub-pixel or integer pixel precision) for the block in the case of inter-prediction.

To perform inter prediction on a current video block, motion estimation unit 1004 may generate motion information for the current video block by comparing one or more reference frames from buffer 1013 to the current video block. Motion compensation unit 1005 may determine a predicted video block for the current video block based on the motion information and decoded samples of pictures from buffer 1013 other than the picture associated with the current video block.

Motion estimation unit 1004 and motion compensation unit 1005 may perform different operations for a current video block, for example, depending on whether the current video block is in an I slice, a P slice, or a B slice.

In some examples, motion estimation unit 1004 may perform uni-directional prediction for the current video block, and motion estimation unit 1004 may search reference pictures of list 0 or list 1 for a reference video block for the current video block. Motion estimation unit 1004 may then generate a reference index that indicates the reference picture in list 0 or list 1 that contains the reference video block and a motion vector that indicates a spatial displacement between the current video block and the reference video block. Motion estimation unit 1004 may output the reference index, a prediction direction indicator, and the motion vector as the motion information of the current video block. Motion compensation unit 1005 may generate the predicted video block of the current block based on the reference video block indicated by the motion information of the current video block.

In other examples, motion estimation unit 1004 may perform bi-directional prediction for the current video block, motion estimation unit 1004 may search the reference pictures in list 0 for a reference video block for the current video block and may also search the reference pictures in list 1 for another reference video block for the current video block. Motion estimation unit 1004 may then generate reference indexes that indicate the reference pictures in list 0 and list 1 containing the reference video blocks and motion vectors that indicate spatial displacements between the reference video blocks and the current video block. Motion estimation unit 1004 may output the reference indexes and the motion vectors of the current video block as the motion information of the current video block. Motion compensation unit 1005 may generate the predicted video block of the current video block based on the reference video blocks indicated by the motion information of the current video block.

In some examples, motion estimation unit 1004 may output a full set of motion information for decoding processing of a decoder. In some examples, motion estimation unit 1004 may not output a full set of motion information for the current video. Rather, motion estimation unit 1004 may signal the motion information of the current video block with reference to the motion information of another video block. For example, motion estimation unit 1004 may determine that the motion information of the current video block is sufficiently similar to the motion information of a neighboring video block.

In one example, motion estimation unit 1004 may indicate, in a syntax structure associated with the current video block, a value that indicates to the video decoder 1100 that the current video block has the same motion information as another video block.

In another example, motion estimation unit 1004 may identify, in a syntax structure associated with the current video block, another video block and a motion vector difference (MVD). The motion vector difference indicates a difference between the motion vector of the current video block and the motion vector of the indicated video block. The video decoder 1100 may use the motion vector of the indicated video block and the motion vector difference to determine the motion vector of the current video block.

As discussed above, video encoder 1000 may predictively signal the motion vector. Two examples of predictive signaling techniques that may be implemented by video encoder 1000 include advanced motion vector prediction (AMVP) and merge mode signaling.

Intra prediction unit 1006 may perform intra prediction on the current video block. When intra prediction unit 1006 performs intra prediction on the current video block, intra prediction unit 1006 may generate prediction data for the current video block based on decoded samples of other video blocks in the same picture. The prediction data for the current video block may include a predicted video block and various syntax elements.

Residual generation unit 1007 may generate residual data for the current video block by subtracting the predicted video block(s) of the current video block from the current video block. The residual data of the current video block may include residual video blocks that correspond to different sample components of the samples in the current video block.

In other examples, there may be no residual data for the current video block for the current video block, for example in a skip mode, and residual generation unit 1007 may not perform the subtracting operation.

Transform processing unit 1008 may generate one or more transform coefficient video blocks for the current video block by applying one or more transforms to a residual video block associated with the current video block.

After transform processing unit 1008 generates a transform coefficient video block associated with the current video block, quantization unit 1009 may quantize the transform coefficient video block associated with the current video block based on one or more quantization parameter (QP) values associated with the current video block.

Inverse quantization unit 1010 and inverse transform unit 1011 may apply inverse quantization and inverse transforms to the transform coefficient video block, respectively, to reconstruct a residual video block from the transform coefficient video block. Reconstruction unit 1012 may add the reconstructed residual video block to corresponding samples from one or more predicted video blocks generated by the prediction unit 1002 to produce a reconstructed video block associated with the current block for storage in the buffer 1013.

After reconstruction unit 1012 reconstructs the video block, the loop filtering operation may be performed to reduce video blocking artifacts in the video block.

Entropy encoding unit 1014 may receive data from other functional components of the video encoder 1000. When entropy encoding unit 1014 receives the data, entropy encoding unit 1014 may perform one or more entropy encoding operations to generate entropy encoded data and output a bitstream that includes the entropy encoded data.

Figure 11:
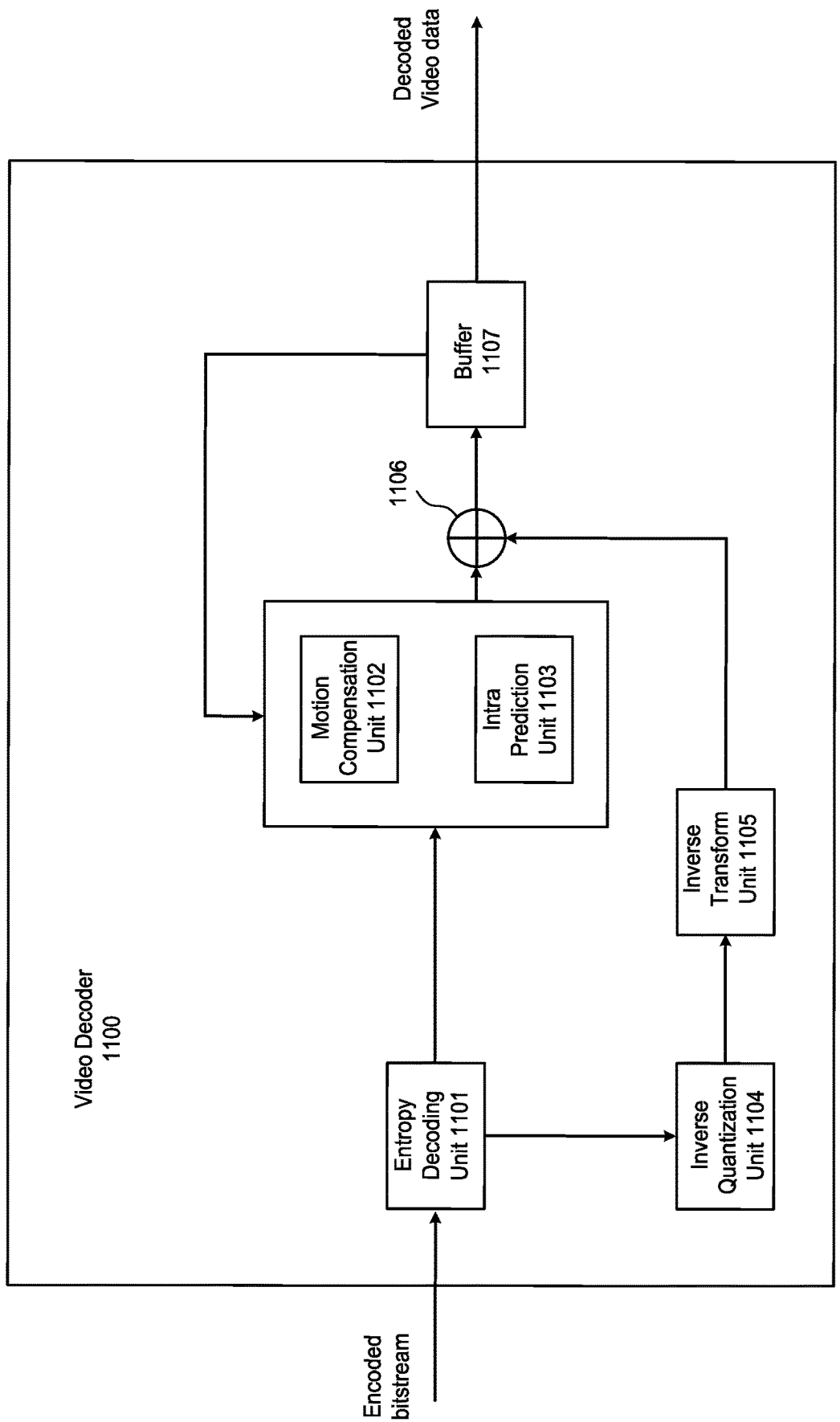
FIG. 11 is a block diagram that illustrates an example decoder.

FIG. 11 is a block diagram illustrating an example of video decoder 1100 which may be video decoder 924 in the system 900 illustrated in FIG. 9.

The video decoder 1100 may be configured to perform any or all of the techniques of this disclosure. In the example of FIG. 11, the video decoder 1100 includes a plurality of functional components. The techniques described in this disclosure may be shared among the various components of the video decoder 1100. In some examples, a processor may be configured to perform any or all of the techniques described in this disclosure.

In the example of FIG. 11, video decoder 1100 includes an entropy decoding unit 1101, a motion compensation unit 1102, an intra prediction unit 1103, an inverse quantization unit 1104, an inverse transformation unit 1105, and a reconstruction unit 1106 and a buffer 1107. Video decoder 1100 may, in some examples, perform a decoding pass generally reciprocal to the encoding pass described with respect to video encoder 1000 (FIG. 10).

Entropy decoding unit 1101 may retrieve an encoded bitstream. The encoded bitstream may include entropy coded video data (e.g., encoded blocks of video data). Entropy decoding unit 1101 may decode the entropy coded video data, and from the entropy decoded video data, motion compensation unit 1102 may determine motion information including motion vectors, motion vector precision, reference picture list indexes, and other motion information. Motion compensation unit 1102 may, for example, determine such information by performing the AMVP and merge mode.

Motion compensation unit 1102 may produce motion compensated blocks, possibly performing interpolation based on interpolation filters. Identifiers for interpolation filters to be used with sub-pixel precision may be included in the syntax elements.

Motion compensation unit 1102 may use interpolation filters as used by video encoder 1000 during encoding of the video block to calculate interpolated values for sub-integer pixels of a reference block. Motion compensation unit 1102 may determine the interpolation filters used by video encoder 1000 according to received syntax information and use the interpolation filters to produce predictive blocks.

Motion compensation unit 1102 may use some of the syntax information to determine sizes of blocks used to encode frame(s) and/or slice(s) of the encoded video sequence, partition information that describes how each macroblock of a picture of the encoded video sequence is partitioned, modes indicating how each partition is encoded, one or more reference frames (and reference frame lists) for each inter-encoded block, and other information to decode the encoded video sequence.

Intra prediction unit 1103 may use intra prediction modes for example received in the bitstream to form a prediction block from spatially adjacent blocks. Inverse quantization unit 1104 inverse quantizes, i.e., de-quantizes, the quantized video block coefficients provided in the bitstream and decoded by entropy decoding unit 1101. Inverse transform unit 1105 applies an inverse transform.

Reconstruction unit 1106 may sum the residual blocks with the corresponding prediction blocks generated by motion compensation unit 1102 or intra-prediction unit 1103 to form decoded blocks. If desired, a deblocking filter may also be applied to filter the decoded blocks in order to remove blockiness artifacts. The decoded video blocks are then stored in buffer 1107, which provides reference blocks for subsequent motion compensation/intra prediction and also produces decoded video for presentation on a display device.

Figure 12:
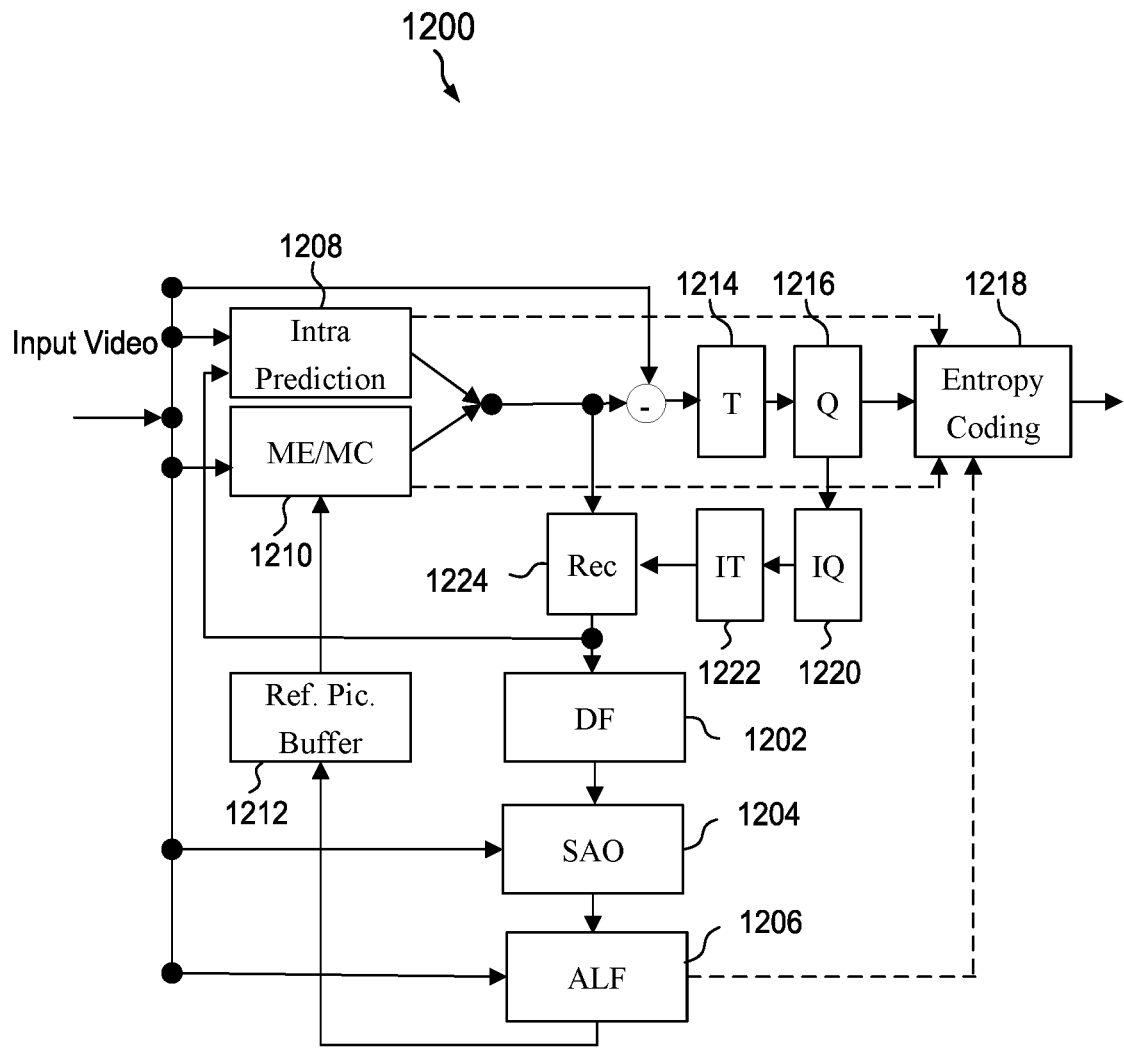
FIG. 12 is a schematic diagram of an example encoder.

FIG. 12 is a schematic diagram of an example encoder 1200. The encoder 1200 is suitable for implementing the techniques of VVC. The encoder 1200 includes three in-loop filters, namely a deblocking filter (DF) 1202, a sample adaptive offset (SAO) 1204, and an adaptive loop filter (ALF) 1206. Unlike the DF 1202, which uses predefined filters, the SAO 1204 and the ALF 1206 utilize the original samples of the current picture to reduce the mean square errors between the original samples and the reconstructed samples by adding an offset and by applying a finite impulse response (FIR) filter, respectively, with coded side information signaling the offsets and filter coefficients. The ALF 1206 is located at the last processing stage of each picture and can be regarded as a tool trying to catch and fix artifacts created by the previous stages.

The encoder 1200 further includes an intra prediction component 1208 and a motion estimation/compensation (ME/MC) component 1210 configured to receive input video. The intra prediction component 1208 is configured to perform intra prediction, while the ME/MC component 1210 is configured to utilize reference pictures obtained from a reference picture buffer 1212 to perform inter prediction. Residual blocks from inter prediction or intra prediction are fed into a transform (T) component 1214 and a quantization (Q) component 1216 to generate quantized residual transform coefficients, which are fed into an entropy coding component 1218. The entropy coding component 1218 entropy codes the prediction results and the quantized transform coefficients and transmits the same toward a video decoder (not shown). Quantization components output from the quantization component 1216 may be fed into an inverse quantization (IQ) components 1220, an inverse transform component 1222, and a reconstruction (REC) component 1224. The REC component 1224 is able to output images to the DF 1202, the SAO 1204, and the ALF 1206 for filtering prior to those images being stored in the reference picture buffer 1212.

A listing of solutions preferred by some examples is provided next.

The following solutions show examples of techniques discussed herein.

1. A visual media processing method (e.g., method 800 depicted in FIG. 8), comprising performing a conversion between a video and a coded bitstream of the video; wherein the coded bitstream conforms to a format rule, wherein the format rule specifies that the coded bitstream includes decoder initialization information, wherein the decoder initialization information is usable by a decoder for initializing decoder resources for the conversion.

2. The method of solution 1, wherein the decoder initialization information includes a number of decoded pictures to be stored in a decoded picture buffer during decoding.

3. The method of any of solutions 1-2, wherein the decoder initialization information includes a maximum picture width in the coded bitstream.

4. The method of any of solutions 1-3, wherein the decoder initialization information includes a maximum picture height in the coded bitstream.

5. The method of any of solutions 1-4, wherein the decoder initialization information includes whether a coding tool is enabled.

6. The method of any of above or below solutions, wherein the decoder is initialized such that a decoded picture buffer is controlled to include a number of picture slots, wherein the number is defined by a pre-defined maximum limit.

7. The method of any of above or below solutions, wherein the decoder is initialized according to a maximum height or a maximum width of coded pictures in the bitstream.

8. The method of any of above solutions, wherein the decoder initialization information is included in a decoding capability information (DCI) network abstraction layer unit (NAL) field according to the format rule.

9. The method of any of above solutions, wherein the decoder initialization information is included in a supplemental enhancement information (SEI) message according to the format rule.

10. The method of any of above solutions, wherein the coded bitstream is formatted according to an international standards organization base media file format (ISOBMFF) format, and to include the decoder initialization information.

11. The method of any of above solutions, wherein the coded bitstream is formatted according to a moving pictures expert group (MPEG) dynamic adaptive streaming over hypertext transfer protocol (DASH) media presentation description (MPD) format to include the decoder initialization information.

12. The method of any of above solutions, wherein the coded bitstream is formatted according to a real time transport protocol (RTP) format to include the decoder initialization information.

13. The method of solution 12, wherein the decoder initialization information is included as a session description protocol parameter.

14. The method of any of above solutions wherein the format rule specifies that the decoder is reinitialized when a profile, a level or a tier of the coded bitstream is changed.

15. The method of any of above solutions wherein the format rule specifies that the decoder is reinitialized when a timing parameter or a hypothetical reference decoder parameter syntax in the coded bitstream is changed.

16. A video decoding apparatus comprising a processor configured to implement a method recited in one or more of solutions 1 to 15.

17. A video encoding apparatus comprising a processor configured to implement a method recited in one or more of solutions 1 to 15.

18. A computer program product having computer code stored thereon, the code, when executed by a processor, causes the processor to implement a method recited in any of solutions 1 to 15.
19. A computer readable medium on which a bitstream complying to a bitstream format that is generated according to any of solutions 1 to 15.
20. A method comprising generating a bitstream according to a method recited in any of solutions 1 to 15 and writing the bitstream to a computer readable medium.
21. A method, apparatus or system described in the present disclosure.

In the solutions described herein, an encoder may conform to the format rule by producing a coded representation according to the format rule. In the solutions described herein, a decoder may use the format rule to parse syntax elements in the coded representation with the knowledge of presence and absence of syntax elements according to the format rule to produce decoded video.

In the present disclosure, the term "video processing" may refer to video encoding, video decoding, video compression or video decompression. For example, video compression algorithms may be applied during conversion from pixel representation of a video to a corresponding bitstream representation or vice versa. The bitstream representation of a current video block may, for example, correspond to bits that are either co-located or spread in different places within the bitstream, as is defined by the syntax. For example, a macroblock may be encoded in terms of transformed and coded error residual values and also using bits in headers and other fields in the bitstream. Furthermore, during conversion, a decoder may parse a bitstream with the knowledge that some fields may be present, or absent, based on the determination, as is described in the above solutions. Similarly, an encoder may determine that certain syntax fields are or are not to be included and generate the coded representation accordingly by including or excluding the syntax fields from the coded representation.

The disclosed and other solutions, examples, embodiments, modules and the functional operations described in this disclosure can be implemented in digital electronic circuitry, or in computer software, firmware, or hardware, including the structures disclosed in this disclosure and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform functions by operating on input data and generating output. The processes and logic flows can also be performed by, and apparatus can also be implemented as, special purpose logic circuitry, e.g., a field programmable gate array (FPGA) or an application specific integrated circuit (ASIC).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., erasable programmable read-only memory (EPROM), electrically erasable programmable read-only memory (EEPROM), and flash memory devices; magnetic disks, e.g., internal hard disks or removable disks; magneto optical disks; and compact disc, read-only memory (CD ROM) and digital versatile disc read-only memory (DVD-ROM) disks. The processor and the memory can be supplemented by, or incorporated in, special purpose logic circuitry.

While the present disclosure contains many specifics, these should not be construed as limitations on the scope of any subject matter or of what may be claimed, but rather as descriptions of features that may be specific to particular embodiments of particular techniques. Certain features that are described in the present disclosure in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in the present disclosure should not be understood as requiring such separation in all embodiments.

Only a few implementations and examples are described and other implementations, enhancements and variations can be made based on what is described and illustrated in the present disclosure.

A first component is directly coupled to a second component when there are no intervening components, except for a line, a trace, or another medium between the first component and the second component. The first component is indirectly coupled to the second component when there are intervening components other than a line, a trace, or another medium between the first component and the second component. The term "coupled" and its variants include both directly coupled and indirectly coupled. The use of the term "about" means a range including ±10% of the subsequent number unless otherwise stated.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled may be directly connected or may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method for processing video data comprising:
signaling video decoder initialization information containing a range of initialization parameters for a plurality of video units when the plurality of video units are coded according to a same video codec and a same profile; and
performing a conversion between a visual media data and a visual media data file based on the range of initialization parameters.

2. The method of claim 1, wherein the plurality of video units comprise bitstreams containing coded video sequences, and wherein the video decoder initialization information is only signaled when the coded video sequences are coded according to the same video codec and when the coded video sequences conform to the same profile.

3. The method of claim 1, wherein the plurality of video units comprise video tracks, wherein the video decoder initialization information is signaled in a file level box or a movie level box of an International Organization for Standardization (ISO) base media file format (ISOBMFF) file, and wherein the video decoder initialization information applies to one or more sets of alternative video tracks that use the same profile of the same video codec.

4. The method of claim 1, wherein the plurality of video units comprise video tracks, wherein the video decoder initialization information is signaled in a file level box or a movie level box of an International Organization for Standardization (ISO) base media file format (ISOBMFF) file, and wherein the video decoder initialization information applies to all video tracks that use the same profile of the same video codec.

5. The method of claim 1, wherein the plurality of video units comprise sample entries in a video track, wherein the video decoder initialization information is signaled in a track level box of an International Organization for Standardization (ISO) base media file format (ISOBMFF) file, and wherein the video decoder initialization information applies to the video track.

6. The method of claim 1, wherein all sample entries of a video track are required to indicate the same profile of the same video codec.

7. The method of claim 1, wherein the video decoder initialization information is signaled in a track group box of an International Organization for Standardization (ISO) base media file format (ISOBMFF) file, and wherein a presence of the video decoder initialization information indicates that a video track is part of a group of video tracks that all use the same profile of the same video codec and share a same video decoder initialization information.

8. The method of claim 1, wherein a presence of the video decoder initialization information indicates that all sample entries in all tracks in a group of video tracks use the same profile of the same video codec and share a same video decoder initialization information.

9. The method of claim 1, wherein the video decoder initialization information is signaled in a track level box of an International Organization for Standardization (ISO) base media file format (ISOBMFF) file, and wherein the video decoder initialization information indicates a current track and all tracks indicated as alternative tracks to the current track use the same profile of the same video codec and share a same video decoder initialization information.

10. The method of claim 1, wherein the plurality of video units comprise representations in an adaptation set, and wherein the video decoder initialization information is only signaled when the representations are coded according to the same video codec and when the representations conform to the same profile.

11. The method of claim 1, wherein the video decoder initialization information is signaled in an adaptation set in a Dynamic Adaptive Streaming over Hypertext Transfer Protocol (DASH) Media Presentation Description (MPD), and wherein the video decoder initialization information applies to all representations in the adaptation set that use the same profile of the same video codec.

12. The method of claim 1, wherein a presence of the video decoder initialization information indicates that all representations of an adaptation set use the same profile of the same video codec.

13. The method of claim 1, wherein the video decoder initialization information comprises a maximum number of decoded pictures (maxDecPics) stored in a decoded picture buffer (DPB) when decoding a bitstream, a maximum decoded picture width (maxDecPicW) of coded pictures in the bitstream, a maximum decoded picture height (maxDecPicH) of coded pictures in the bitstream, or combinations thereof; or the video decoder initialization information comprises an indication of usage of inter-layer prediction, reference picture resampling, wrap-around motion compensation, motion vector prediction from reference pictures, palette coding mode, adaptive color transform, intra block copy, adaptive loop filter (ALF) adaptation parameter set (APS) network abstraction layer (NAL) unit, luma mapping with chroma scaling (LMCS) APS NAL unit, scaling list APS NAL unit, or combinations thereof in a corresponding bitstream.

14. The method of claim 1, wherein the video decoder initialization information comprises an indication of a maximum picture order count between a current picture and a corresponding reference picture; or the video decoder initialization information comprises an indication of maximum color format, maximum bit depth, maximum coded picture buffer size, minimum coding unit (CU) size, scaling ratio calculation information, or combinations thereof.

15. The method of claim 1, wherein the video decoder initialization information comprises an indication of usage of deblocking, padding, sub-picture partitioning, slice partitioning, tile partitioning, wrap-around motion compensation, reference picture resampling, long term reference pictures, or combinations thereof; or the video decoder initialization information comprises a maximum tier to which all coded video sequences (CVSs) of a corresponding bitstream conform, a maximum level to which all CVSs of a corresponding bitstream conform, or combinations thereof.

16. The method of claim 1, wherein the video decoder initialization information comprises an indication of a video codec used to perform the conversion between the visual media data and the visual media data file; or the video decoder initialization information comprises a profile to which all bitstreams conform.

17. The method of claim 1, wherein the conversion comprises generating the visual media data file according to the visual media data.

18. The method of claim 1, wherein the conversion comprises parsing the visual media data file to obtain the visual media data.

19. An apparatus for processing video data comprising a processor and a non-transitory memory with instructions thereon, wherein the instructions upon execution by the processor, cause the processor to:

signal video decoder initialization information containing a range of initialization parameters for a plurality of video units when the plurality of video units are coded according to a same video codec and a same profile; and perform a conversion between a visual media data and a visual media data file based on the range of initialization parameters.

20. A non-transitory computer readable medium storing instructions that cause a processor to:

signal video decoder initialization information containing a range of initialization parameters for a plurality of video units when the plurality of video units are coded according to a same video codec and a same profile; and perform a conversion between a visual media data and a visual media data file based on the range of initialization parameters.

* * * * *